(12) United States Patent
Maeno

(10) Patent No.: US 9,116,708 B2
(45) Date of Patent: Aug. 25, 2015

(54) PROGRAM CREATION SUPPORT APPARATUS, PROGRAM, AND INFORMATION SYSTEM

(75) Inventor: Yoshiharu Maeno, Tokyo (JP)

(73) Assignee: NEC CORPORATION, Tokyo (JP)

( * ) Notice: Subject to any disclaimer, the term of this patent is extended or adjusted under 35 U.S.C. 154(b) by 248 days.

(21) Appl. No.: 13/582,794

(22) PCT Filed: Feb. 7, 2011

(86) PCT No.: PCT/JP2011/000672
§ 371 (c)(1),
(2), (4) Date: Sep. 5, 2012

(87) PCT Pub. No.: WO2011/108193
PCT Pub. Date: Sep. 9, 2011

(65) Prior Publication Data
US 2013/0007697 A1    Jan. 3, 2013

(30) Foreign Application Priority Data
Mar. 5, 2010  (JP) .................... 2010-049333

(51) Int. Cl.
G06F 9/44    (2006.01)
(52) U.S. Cl.
CPC . G06F 8/36 (2013.01); G06F 8/316 (2013.01)
(58) Field of Classification Search
CPC ............. G06F 8/33; G06F 8/35; G06F 8/355; G06F 8/36; G06F 8/71; G06F 8/76
USPC ......................................................... 717/111
See application file for complete search history.

(56) References Cited

U.S. PATENT DOCUMENTS 6,038,395 A * 3/2000 Chow et al. .................. 717/105
6,134,552 A * 10/2000 Fritz et al. ............................ 1/1
(Continued)

FOREIGN PATENT DOCUMENTS

JP    2002-157117 A    5/2002
JP    2002-202885 A    7/2002
(Continued)

OTHER PUBLICATIONS

Hayato Kanai et al.; "Aspect-Oriended Method to Change Mechanisms for Model Checking"; IPSJ SIG Notes, Sep. 19, 2008, vol. 2008, No. 93, pp. 49-56.

(Continued)

*Primary Examiner* — Lewis A Bullock, Jr.
*Assistant Examiner* — Francisco Aponte
(74) *Attorney, Agent, or Firm* — Arent Fox LLP

(57) ABSTRACT

A program creation support apparatus (100) includes: a table storage unit (110) which stores a basic program management table (112) that manages a basic program, an individual requirement management table (114) that manages individual requirements of users, and a user management table (116) that manages individual requirements in association with the users; a template storage unit (122) that stores model forms of aspects; a program editing unit (130) that presents an editing target program to a program developer, receives editing operations of inserting individual requirements of each user, and edits the program; an individual requirement management unit (128) that registers the received individual requirements in the respective management tables in association with corresponding sets of program strings of the basic program with respect to each target user; and an aspect synthesizing unit (140) that synthesizes the aspect using the model forms in accordance with each management table.

19 Claims, 19 Drawing Sheets

(56) References Cited

U.S. PATENT DOCUMENTS

| | | | |
|---|---|---|---|
| 7,555,742 B2* | 6/2009 | Iborra et al. | 717/101 |
| 8,136,094 B2* | 3/2012 | Nadon et al. | 717/126 |
| 8,229,579 B2* | 7/2012 | Eldridge et al. | 700/31 |
| 8,327,351 B2* | 12/2012 | Paladino et al. | 717/177 |
| 8,671,124 B2* | 3/2014 | Khader et al. | 707/899 |
| 2003/0149699 A1* | 8/2003 | Tsao | 707/100 |
| 2003/0172368 A1* | 9/2003 | Alumbaugh et al. | 717/106 |
| 2007/0083551 A1* | 4/2007 | Jezierski et al. | 707/103 R |
| 2007/0106982 A1* | 5/2007 | Dalal et al. | 717/128 |
| 2008/0103752 A1 | 5/2008 | Enomoto et al. | |
| 2009/0089746 A1* | 4/2009 | Rigolet | 717/113 |
| 2011/0004612 A1* | 1/2011 | Boyersmith et al. | 707/769 |

FOREIGN PATENT DOCUMENTS

| | | |
|---|---|---|
| JP | 2004-362442 A | 12/2004 |
| JP | 2007-213487 A | 8/2007 |
| JP | 2008-117067 A | 5/2008 |
| JP | 2009-512014 A | 3/2009 |

OTHER PUBLICATIONS

International Search Report for International Appl No. PCT/JP2011/000672, date of mailing Mar. 29, 2011.

* cited by examiner

FIG. 3

112 BASIC PROGRAM MANAGEMENT TABLE

| LINE NUMBER | PROGRAM STRING |
|---|---|
| #1 | A |
| #2 | BLANK |
| #3 | B |
| #4 | BLANK |
| #5 | C |
| #6 | BLANK |
| ⋮ | ⋮ |

FIG. 4

114 INDIVIDUAL REQUIREMENT MANAGEMENT TABLE

| INDIVIDUAL REQUIREMENT | PROGRAM STRING |
|---|---|
| 10 | A10<br>B10<br>⋮ |
| 11 | A11<br>B11<br>⋮ |
| 20 | A20<br>B20<br>⋮ |
| ⋮ | ⋮ |

FIG. 5

116 USER MANAGEMENT TABLE

| USER ID (TID) | LINE NUMBER | LINE NUMBER | LINE NUMBER |
| --- | --- | --- | --- |
| | REQUIREMENT | REQUIREMENT | REQUIREMENT |
| 0001 | #6 | #11 | ... |
| | INDIVIDUAL REQUIREMENT 10 | INDIVIDUAL REQUIREMENT 11 | ... |
| 0002 | #6 | ... | |
| | INDIVIDUAL REQUIREMENT 20 | ... | |
| ⋮ | | | |

FIG. 10

| Line No. | Program Editor (TID0001) 214 |
|---|---|
| 1 | PROGRAM STRING A |
| 2 | 216 |
| 3 | PROGRAM STRING B |
| 4 | |
| 5 | PROGRAM STRING C |
| 6 | ← 218 |
| 7 | PROGRAM STRING D |
| 8 | |
| 9 | PROGRAM STRING E |
| 10 | |
| 11 | PROGRAM STRING F |
| 12 | |
| 13 | PROGRAM STRING G |
| 14 | |
| 15 | PROGRAM STRING H |
| 16 | |
| 17 | PROGRAM STRING I |

| Line No. | Program Editor (TID0001) |
|---|---|
| 1 | PROGRAM STRING A |
| 2 | |
| 3 | PROGRAM STRING B |
| 4 | |
| 5 | PROGRAM STRING C |
| 6 | INDIVIDUAL REQUIREMENT 10 |
| 7 | PROGRAM STRING D |
| 8 | |
| 9 | PROGRAM STRING E |
| 10 | |
| 11 | PROGRAM STRING F |
| 12 | |
| 13 | PROGRAM STRING G |

FIG. 12

| Line No. | Program Editor (TID0001) |
|---|---|
| 1 | PROGRAM STRING A |
| 2 | |
| 3 | PROGRAM STRING B |
| 4 | |
| 5 | PROGRAM STRING C |
| 6 | INDIVIDUAL REQUIREMENT 10 |
| 7 | PROGRAM STRING D |
| 8 | |
| 9 | PROGRAM STRING E |
| 10 | |
| 11 | INDIVIDUAL REQUIREMENT 11 |
| 12 | PROGRAM STRING G |
| 13 | |
| 14 | PROGRAM STRING H |

FIG. 13

| Line No. | Program Editor (TID0002) |
|---|---|
| 1 | PROGRAM STRING A |
| 2 | |
| 3 | PROGRAM STRING B |
| 4 | |
| 5 | PROGRAM STRING C |
| 6 | INDIVIDUAL REQUIREMENT 20 |
| 7 | PROGRAM STRING D |
| 8 | |
| 9 | PROGRAM STRING E |
| 10 | |
| 11 | PROGRAM STRING F |
| 12 | |
| 13 | PROGRAM STRING G |

FIG. 14

```
Aspect ***{
    Before ***
        ACQUIRE TENANT ID;
    if(TID==***){
        do ***
    }else if(TID==***){
        do ***
    }
}
```

```
Aspect XXX{
    Before PROGRAM STRING D
    ACQUIRE TENANT ID
    if(TID==0001){
        do INDIVIDUAL REQUIREMENT 10
    }else if(TID==0002){
        do INDIVIDUAL REQUIREMENT 20
    }
}
```

PROGRAM CREATION SUPPORT APPARATUS, PROGRAM, AND INFORMATION SYSTEM

TECHNICAL FIELD

The present invention relates to a program creation support apparatus, a program, and an information system. More particularly, the present invention relates to a program creation support apparatus, a program, and an information system that supports creation of a program meeting the needs of different users based on a basic application program.

BACKGROUND ART

An example of a system that supports an operation of modifying an existing application is described in Patent Document 1 (JP 2008-117067 A). An annotation is information that imparts meaning to individual elements of a program and is not deleted when compiling unlike comments. The system disclosed in Patent Document 1 having such a configuration operates as follows. An annotation detection unit identifies an individual situation, an input interface conversion unit changes an input interface, an output interface conversion unit changes an output interface, and a new model creation unit creates a design model that calls the changed interface and stores the result thereof in a design model storage unit.

Another example of the system that supports an operation of modifying an existing application is disclosed in Patent Document 2 (JP 2007-213487 A). The system disclosed in Patent Document 2 includes a user interface management unit, a class information analyzing unit, an advice analyzing unit, and an aspect generating unit. In aspect-oriented programming, an aspect means a process that is independent of the functional requirements of an application such as outputting of logs. The process that is independent of the functional requirements of the application is implemented by incorporating the aspect in the application program when deploying or executing programs. The definition of specific processing of the aspect is referred to as an advice. The position within the application program that incorporates the aspect is referred to as a pointcut. The description of the aspect includes an advice and a pointcut.

The system disclosed in Patent Document 2 having such a configuration operates as follows. The class information analyzing unit generates candidates for a class or method that defines an aspect. The advice analyzing unit generates candidates for a data structure to be included in an advice. The user interface management unit displays these candidates so that a user selects a candidate. Based on the result of the selection, the aspect generating unit generates an aspect.

When deploying or executing a program using an aspect-oriented programming technique, it is possible to create a customized program corresponding to user individual requirements using a multi-deployment program that branches to different sets of program strings for each user by referring to a user identifier. When multi-deployment is performed, a framework program that represents a logic that branches to different sets of program strings for each user by referring to the user identifier is automatically inserted to an application program. Different sets of program strings for each user are executed even if it is not stated in the application program.

RELATED DOCUMENT

Patent Document

[Patent Document 1] Japanese Laid-open patent publication NO. 2008-117067
[Patent Document 2] Japanese Laid-open patent publication NO. 2007-213487

DISCLOSURE OF THE INVENTION

In the method of allowing a developer to create an aspect in accordance with the aspect-oriented programming technique, there is a problem in that it is difficult to identify custom programs (effective programs different for each user) of each user. One of the reasons therefor is that if a large number of user individual requirements are implemented in one aspect, or the individual requirements of one user is implemented by being distributed to a plurality of aspects, the developer has to take the two perspectives of aspect and user into consideration, which results in complexity of the operation.

An object of the present invention is to provide a program creation support apparatus, a program, and an information system capable of eliminating the complexity of the editing operation during development of programs as described above.

A program creation support apparatus according to the present invention is a program creation support apparatus that creates the application program that implements the individual requirements of each user together with the basic program. The program creation support apparatus according to the present invention includes: a table storage device that stores a basic program management table that manages a plurality of sets of program strings that configures a basic program common to users of a development target application program, an individual requirement management table that manages sets of program strings that respectively implement individual requirements which can be defined for each user separately from the basic program, and a user management table that manages the individual requirements in association with each of the users; a template storage device that stores model forms for generating aspects that implement the individual requirements; a program editing unit that presents an editing target program to a program developer by referring to the table storage device, receives editing operations of inserting the individual requirements which can be defined for each user in the basic program, and edits the program in accordance with the received editing operations; an individual requirement management unit that manages the individual requirements received by the program editing unit by registering the individual requirements in the user management table, the basic program management table, and the individual requirement management table in association with corresponding sets of program strings of the basic program with respect to each target user; and a synthesizing unit that synthesizes the aspect using the model form in accordance with the user management table, the basic program management table, and the individual requirement management table by referring to the table storage device and the template storage device.

An information system according to the present invention includes: a table storage device that stores a basic program management table that manages a plurality of sets of program strings that configures a basic program common to the users of a development target application program, an individual requirement management table that manages sets of program strings that respectively implement individual requirements which can be defined for each user separately from the basic program, and a user management table that manages the individual requirement in association with each of the users; a program storage device that stores a plurality of sets of the program strings of the basic program of an application program and the sets of program strings that respectively implement the individual requirement; a template storage device that stores model forms for generating an aspect that implements the individual requirements; a program editing unit that presents an editing target program to a program developer by referring to the table storage device, receives editing operations of inserting the individual requirement which can be defined for each user in the basic program, and edits the program; an individual requirement management unit that manages the individual requirements received by the program editing unit by registering the individual requirements in the user management table, the basic program management table, and the individual requirement management table in association with corresponding sets of program strings of the basic program with respect to each target user; a synthesizing unit that synthesizes the aspect using the model form in accordance with the user management table, the basic program management table, and the individual requirement management table by referring to the table storage device and the template storage device; and a program executing unit that executes the application program that implements the individual requirements of each user together with the basic program by incorporating the aspect synthesized by the synthesizing unit.

According to the present invention, there is provided a program for causing a computer to implement a program creation support apparatus for creating a development target application program, and the program creation support apparatus includes: a table storage device that stores a basic program management table that manages a plurality of sets of program strings that configure a basic program common to users of the application program, an individual requirement management table that manages sets of program strings that respectively implement individual requirements which can be defined for each user separately from the basic program, and a user management table that manages the individual requirements in association with each of the users; a template storage device that stores model forms for generating an aspect that implements the individual requirements; a display unit that displays an operation screen to present the operation screen to a program developer; and an operating unit that receives operations of the program developer, the program causing the computer to execute: a procedure for displaying and presenting an editing screen for allowing the program developer to edit an editing target program by referring to the table storage device; a procedure for receiving editing operations of inserting the individual requirement, which can be defined for each user, in the basic program from the program developer through the operating unit; a procedure for editing the program in accordance with the received editing operations; a procedure for managing the received individual requirements by registering the individual requirements in the user management table, the basic program management table, and the individual requirement management table in association with corresponding sets of program strings of the basic program with respect to each target user; a procedure for synthesizing an aspect using the model form in accordance with the user management table, the basic program management table, and the individual requirement management table by referring to the table storage device and the template storage device; and a procedure for executing the application program that implements the individual requirements of each user together with the basic program.

It should be noted that any combinations of the above components are also valid as exemplary embodiments of the present invention, and the wordings used in the present invention may be switchably used for describing a method, a device, a system, a recording medium, and a computer program as exemplary embodiments of the present invention.

Also, the various components of the present invention are not necessarily independent of each other. Instead, a plurality of components may be formed as a single element, a single component may be formed by a plurality of elements, a component may be a part of another component, or a part of a component may be a part of another component, for example.

Although a plurality of procedures according to the data processing method and the computer program of the present invention are described in order of execution, the order described herein does not limit the order of execution of the plurality of procedures. Therefore, when the data processing method and the computer program of the present invention are executed, the order of the plurality of procedures may be changed, without any adverse influence on the contents of the procedures.

Further, the plurality of procedures according to the data processing method and the computer program of the present invention are not necessarily performed at different times from one another. Therefore, a procedure may be carried out while another procedure is being carried out, or execution of a procedure may overlap with execution of another procedure in terms of timing, entirely or partly, for example.

According to the present invention, a program creation support apparatus, a program, and an information system capable of eliminating the complexity of the editing operation during development of programs are provided.

BRIEF DESCRIPTION OF THE DRAWINGS

The above and other objects, features and advantages of the present invention will become more apparent from the following description of certain preferred exemplary embodiments taken in conjunction with the accompanying drawings.

FIG. 3 is a diagram illustrating an example of a basic program management table of the program creation support apparatus according to the exemplary embodiment of the present invention.

FIG. 4 is a diagram illustrating an example of an individual requirement management table of the program creation support apparatus according to the exemplary embodiment of the present invention.

FIG. 5 is a diagram illustrating an example of a user management table of the program creation support apparatus according to the exemplary embodiment of the present invention.

FIG. 10 is a diagram illustrating an example of a program editor screen of the program creation support apparatus according to the exemplary embodiment of the present invention.

FIG. 11 is a diagram illustrating an example of the program editor screen when editing individual requirement, of the program creation support apparatus according to the exemplary embodiment of the present invention.

FIG. 12 is a diagram illustrating another example of the program editor screen when editing individual requirement, of the program creation support apparatus according to the exemplary embodiment of the present invention.

FIG. 13 is a diagram illustrating another example of the program editor screen when editing individual requirement, of the program creation support apparatus according to the exemplary embodiment of the present invention.

FIG. 14 is a diagram illustrating an example of a template of the program creation support apparatus according to the exemplary embodiment of the present invention.

FIG. 16 is a diagram illustrating an example of an aspect created by the program creation support apparatus according to the exemplary embodiment of the present invention.

DESCRIPTION OF EXEMPLARY EMBODIMENTS

Figure 1:
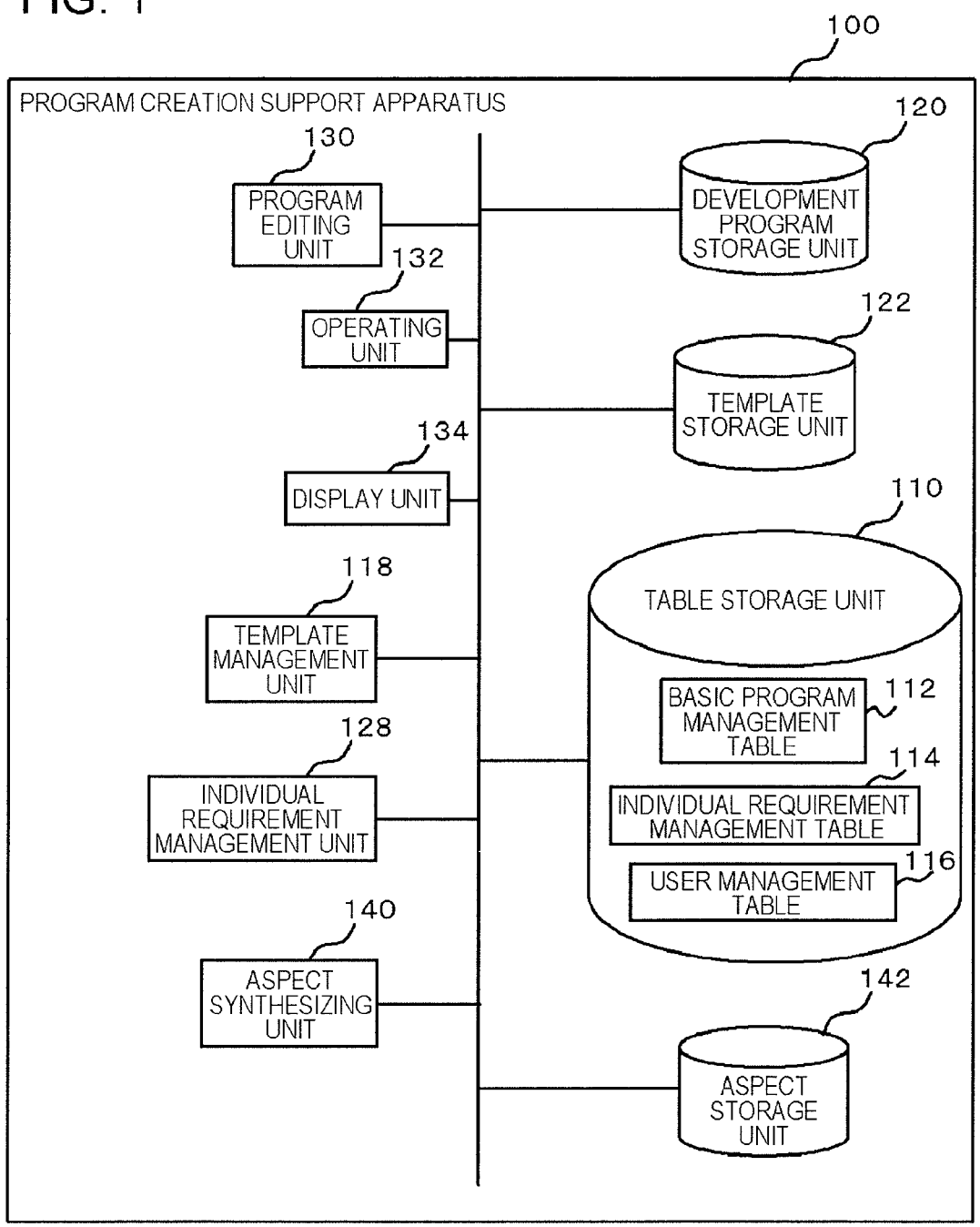
FIG. 1 is a functional block diagram illustrating the configuration of a program creation support apparatus according to an exemplary embodiment of the present invention.

Hereinafter, exemplary embodiments of the present invention will be described with reference to the drawings. Throughout the drawings, like constituent components are denoted by like reference numerals, and description will not be provided appropriately.

An information system of the present exemplary embodiment is configured to provide an online service to a large number of tenant companies using application programs which have been already developed. In the present exemplary embodiment, users are tenant companies, for example, and mean the users of the information system that provides the online service using the application programs which have been already developed. Each user may make an agreement in advance on the use of this information system and use the service, for example, by acquiring a user account and logging into this system using a user ID and a password.

The information system of the present exemplary embodiment is configured to create and execute a custom program obtained by adding processing to an application program, which is a basic program, in order to meet individual requirements unique to respective users (tenant companies), for example, different data or processing requirements, to thereby provide a service to users.

In the information system of the present exemplary embodiment, a process that is independent of the functional requirements of an application is implemented by incorporating an aspect in the application program when deploying or executing programs. A definition of specific processing of the aspect is referred to as an advice. The position within the application program that incorporates the aspect is referred to as a pointcut. The description of the aspect includes an advice and a pointcut.

FIG. 1 is a functional block diagram illustrating the configuration of a program creation support apparatus 100 according to the exemplary embodiment of the present invention. The program creation support apparatus 100 of the present exemplary embodiment is configured to support the creation of an application program that implements individual requirements for each user together with a basic program so that a program developer can easily develop and maintain a custom program for each tenant, corresponding to the tenant's individual requirements. In the present exemplary embodiment, although the program developer and the user are different persons, the present invention is not limited to this. The users themselves may customize a program using the program creation support apparatus 100.

The program creation support apparatus 100 according to the exemplary embodiment of the present invention includes: a table storage unit 110 that stores a basic program management table 112 that manages a plurality of sets of program strings that constitutes a basic program common to the users of a development target application program, an individual requirement management table 114 that manages sets of program strings that respectively implement individual requirements which can be defined for each user separately from the basic program, and a user management table 116 that manages the individual requirements in association with each of the users; a template storage unit 122 that stores model forms for generating aspects that implement the individual requirements; a program editing unit 130 that refers to the table storage unit 110, presents an editing target program to a program developer, receives editing operations of inserting the individual requirements which can be defined for each user in the basic program, and edits the program in accordance with the received editing operations; an individual requirement management unit 128 that manages the individual requirements received by the program editing unit 130 by registering the individual requirements in the user management table 116, the basic program management table 112, and the individual requirement management table 114 in association with corresponding sets of program strings of the basic program with respect to each target user; and an aspect synthesizing unit 140 that synthesizes the aspect using the model form in accordance with the definitions registered in the user management table 116, the basic program management table 112, and the individual requirement management table 114 by referring to the table storage unit 110 and the template storage unit 122.

In the present exemplary embodiment, the program creation support apparatus 100 includes a central processing unit (CPU), a memory, a hard disk, and a communication device, which are not illustrated in the drawings, for example. The program creation support apparatus 100 may be implemented by a server computer or a personal computer connected to an input device such as a keyboard and a mouse and an output device such as a display and a printer, or a device equivalent to the server computer or the personal computer. When the CPU reads programs stored in the hard disk into the memory and executing the same, the respective functions of the respective units may be implemented.

In the following respective drawings, the configuration of portions which are not related to the nature of the present invention is neither described nor illustrated.

Figure 2:
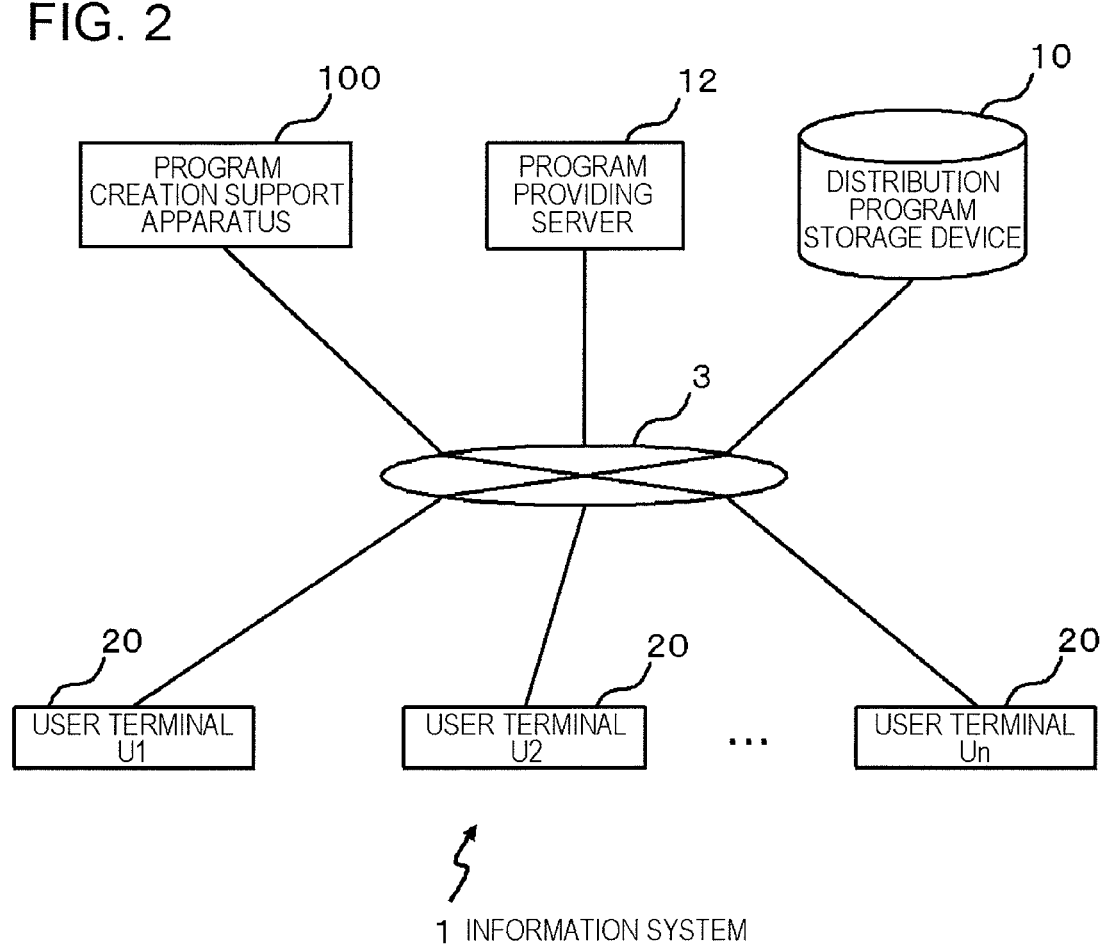
FIG. 2 is a block diagram illustrating the configuration of an information system according to the exemplary embodiment of the present invention.

The application programs customized for each user (tenant company), created by the program creation support apparatus 100 of the present exemplary embodiment are executed by an information system 1 illustrated in FIG. 2, and a service is provided to user terminals 20 of the respective users.

The respective constituent components of the information system are implemented by an arbitrary combination of hardware and software of an arbitrary computer mainly including a CPU, a memory, a program that implements the constituent components of the drawings loaded into the memory, a storage unit such as a hard disk storing the program, and a network connection interface. It will be understood by those skilled in the art that various modifications of the implementation method and device thereof are possible. The respective drawings described below illustrate functional blocks rather than hardware blocks.

In the present exemplary embodiment, the information system 1 includes a distribution program storage device 10, a program providing server 12, the program creation support apparatus 100, and a plurality of user terminals 20 (user terminal U1, user terminal U2, . . . , and user terminal Un (where n is a natural number)) of a plurality of tenant companies, which are connected to each other through a network 3.

Sets of program strings that implement the basic program and the individual requirements so that the custom programs may be executed, and the basic program management table 112, the individual requirement management table 114, and the user management table 116 registered in the table storage unit 110 of the program creation support apparatus 100 are copied and stored in the distribution program storage device 10. The program providing server 12 may execute the basic program by incorporating aspects in the basic program based on the information stored in the basic program management table 112, the individual requirement management table 114, and the user management table 116 and provides a service to the user terminals 20 of the respective tenant companies. Alternatively, the custom programs which have been developed by the program creation support apparatus 100 and customized in accordance with the needs of respective users may be stored in the distribution program storage device 10 and executed by the program providing server 12 in accordance with the needs of the users.

The program providing server 12 may include a storage unit such as the table storage unit 110 of the program creation support apparatus 100 and may share the table storage unit 110 by obtaining the same from the program creation support apparatus 100 and the program providing server 12. Moreover, the distribution program storage device 10 and the development program storage unit 120 may be included in the same storage device.

Moreover, the program creation support apparatus 100 is not necessarily connected to the network 3 but may be independent of the network 3. In this case, the custom programs created by the program creation support apparatus 100 may be stored in the distribution program storage device 10 through a recording medium. Moreover, in the present exemplary embodiment, although the program providing server 12 is configured to provide a service using an application program through online to the user terminals 20 of tenant companies, the invention is not limited to this. The program providing server 12 may be a system that creates programs customized in accordance with the needs of respective users based on the basic program and provides the created custom programs to the user terminals 20 of respective tenant companies through offline or online so that the respective user terminals 20 may execute the custom programs in offline.

As illustrated in FIG. 2, the information system 1 according to the exemplary embodiment of the invention includes: the program creation support apparatus 100 of FIG. 1; the development program storage unit 120 that stores a plurality of sets of program strings of the basic program of an application program and sets of program strings for respectively implementing individual requirements; and a program execution unit (the program providing server 12 or the program creation support apparatus 100) executing the application program that implements the individual requirements of each users together with the basic program by incorporating the aspect synthesized by the aspect synthesizing unit 140 of the program creation support apparatus 100.

Returning to FIG. 1, the program creation support apparatus 100 of the present exemplary embodiment includes the table storage unit 110, the table management unit 118, the development program storage unit 120, the template storage unit 122, the individual requirement management unit 128, the program editing unit 130, the operating unit 132, the display unit 134, the aspect synthesizing unit 140, and the aspect storage unit 142.

The operating unit 132 includes an input device such as a keyboard and a mouse connected to a computer that implements the program creation support apparatus 100, and receives operations input by the program developer. The display unit 134 displays various screens on a display or the like connected to the computer that implements the program creation support apparatus 100 so that the program developer may refer to various types of information presented on the screens.

The development program storage unit 120 stores the basic program of a development target application program and a program or the like including sets of program strings that respectively implement the individual requirements unique to respective users.

The table storage unit 110 stores the basic program management table 112, the individual requirement management table 114, and the user management table 116. In the present exemplary embodiment, although the development program storage unit 120 is configured to be included in the program creation support apparatus 100, the development program storage unit 120 may not necessarily be included in the program creation support apparatus 100. The development program storage unit 120 may be configured to read a program stored in an external program storage unit of the program creation support apparatus 100 from the program storage unit.

The table management unit 118 manages the basic program management table 112, the individual requirement management table 114, and the user management table 116 which are stored in the table storage unit 110. Here, management means that the table management unit 118 includes a mechanism for allowing these management tables to be permanently maintained in the table storage unit 110, and may access the table storage unit 110 and create, register, update, and refer to the respective management tables. The respective management tables may be presented to the program developer by displaying browser screens of each management table on the display unit 134.

Moreover, the table management unit 118 determines whether management information related to a development target application program of the program creation support apparatus 100 of the present exemplary embodiment is present in the table storage unit 110. When the management information is not present, the table management unit 118 generates a new necessary table in accordance with the development target application program and stores the created table in the table storage unit 110 in association with the application program.

Figure 9:
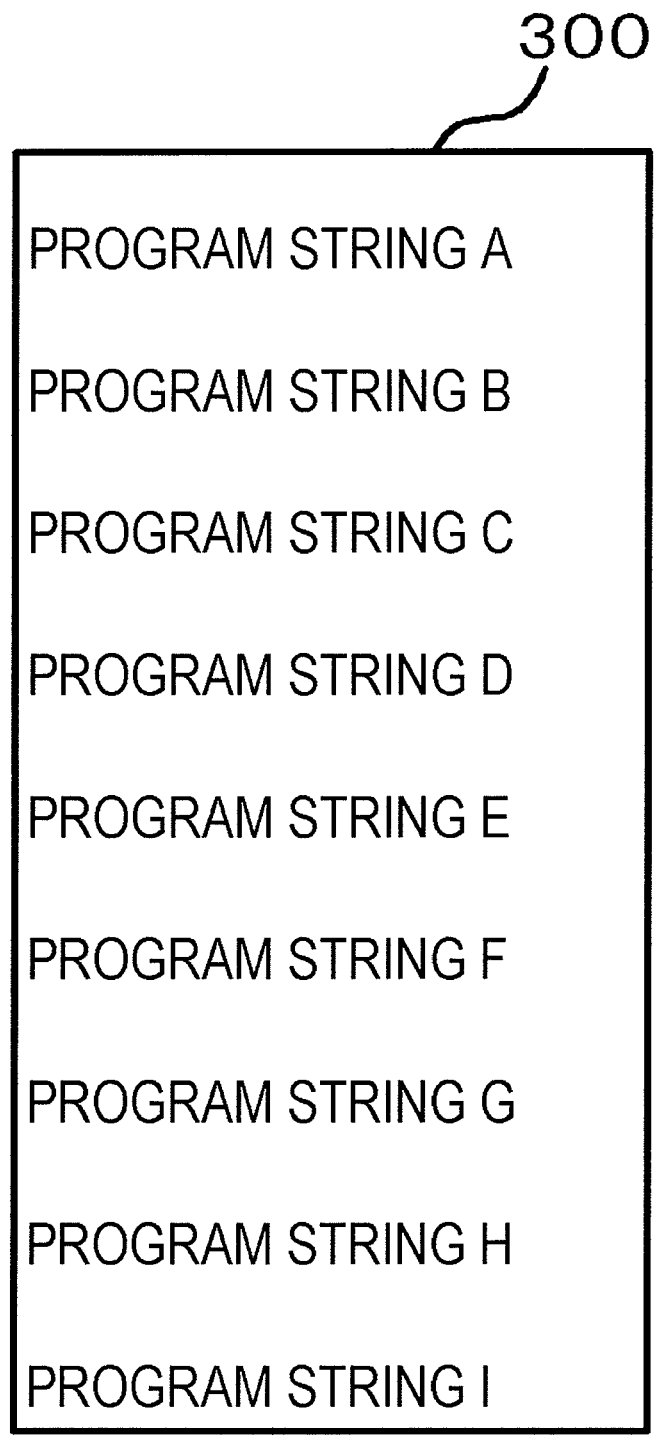
FIG. 9 is a diagram illustrating an example of a basic program list of the program creation support apparatus according to the exemplary embodiment of the present invention.

The basic program management table 112 stores the management information of the basic program of the development target application program of the program creation support apparatus 100 of the present exemplary embodiment. As illustrated in a basic program list 300 of FIG. 9, the basic program of the present exemplary embodiment includes nine sets of program strings of a set A of program strings to a set I of program strings. Here, the basic program includes a plurality of sets of program strings in a plurality of lines, each of set of program strings being described in a programming language such as Java (registered trademark) or C++.

As described above, the table management unit 118 determines whether the basic program management table 112 of the development target application program is present in the table storage unit 110. When the basic program management table 112 is not present, the table management unit 118 creates a new basic program management table 112 based on the development target application program and stores the created table in the table storage unit 110.

As illustrated in FIG. 3, the basic program management table 112 of the present exemplary embodiment stores the line numbers of a plurality of sets of program strings included in the basic program of the development target application program stored in the development program storage unit 120 and respective corresponding the sets of program strings in association. Respective items of information on all sets of program strings of the basic program are stored in the basic program management table 112. In the present exemplary embodiment, it is assumed that the entities of the basic program, namely program codes are stored in the development program storage unit 120.

Moreover, in the basic program of the present exemplary embodiment, assuming that a blank line (an empty line) is present between two successive sets of program strings, the table management unit 118 creates the basic program management table 112 by assigning a line number to the blank line so that the positions of the blank lines between sets of program strings may be designated. In the present exemplary embodiment, the basic program management table 112 arranges respective sets of program strings in respective lines in a row in association with respective corresponding line numbers, inserts respective blank lines between respective sets of program strings, assigns a line number to each line, and manages the set of program strings using the line number as a position identifier of the set of program strings.

For example, a line number of #2 is assigned to the blank line between a set A of program strings and a set B of program strings, and the line numbers of the sets A and B of program strings become #1 and #3, respectively.

As illustrated in FIG. 3, line-based management in which a line number is used as a position identifier that designates the position within the basic program is the most basic method. However, as another example, sets of program strings in multiple lines may be defined as one block, and the set of program strings may be managed in units of blocks as a combination of a block number and the corresponding sets of program strings. In this case, assuming that a blank block (an empty block) is present between two successive blocks, the table management unit 118 may creates the basic program management table 112 by assigning a block number so that the position between blocks may be designated.

As illustrated in FIG. 4, the individual requirement management table 114 stores at least one combination of the identification information of individual requirement (individual requirement name) and a set of program strings representing the individual requirement in association. For example, information representing that individual requirement 10 includes a set A10 of program strings, a set B10 of program strings, and the like is stored as management information. In the present exemplary embodiment, it is assumed that the entities of the respective sets of program strings, namely program codes are stored in the development program storage unit 120.

In another exemplary embodiment, the sets of program strings of the basic program and the sets of program strings of the individual requirements may be stored in the basic program management table 112 and the individual requirement management table 114, respectively, as the entities of the sets of program strings, namely the program codes themselves, so that the development program storage unit 120 may be unnecessary.

As illustrated in FIG. 5, the user management table 116 stores individual requirements unique to each of the users (tenants) in association. For example, the user management table 116 stores a plurality of combinations of the identification information (user ID (TID)) of each user (tenant), line numbers within the basic program executing the individual requirements, and the identification information of the individual requirements (individual requirement name) unique to each user which needs to be executed at that line numbers. For example, individual requirements 10 and 11 unique to the user of which the user ID is TID0001 are stored in association with line numbers of #6 and #11, respectively.

Figure 14:
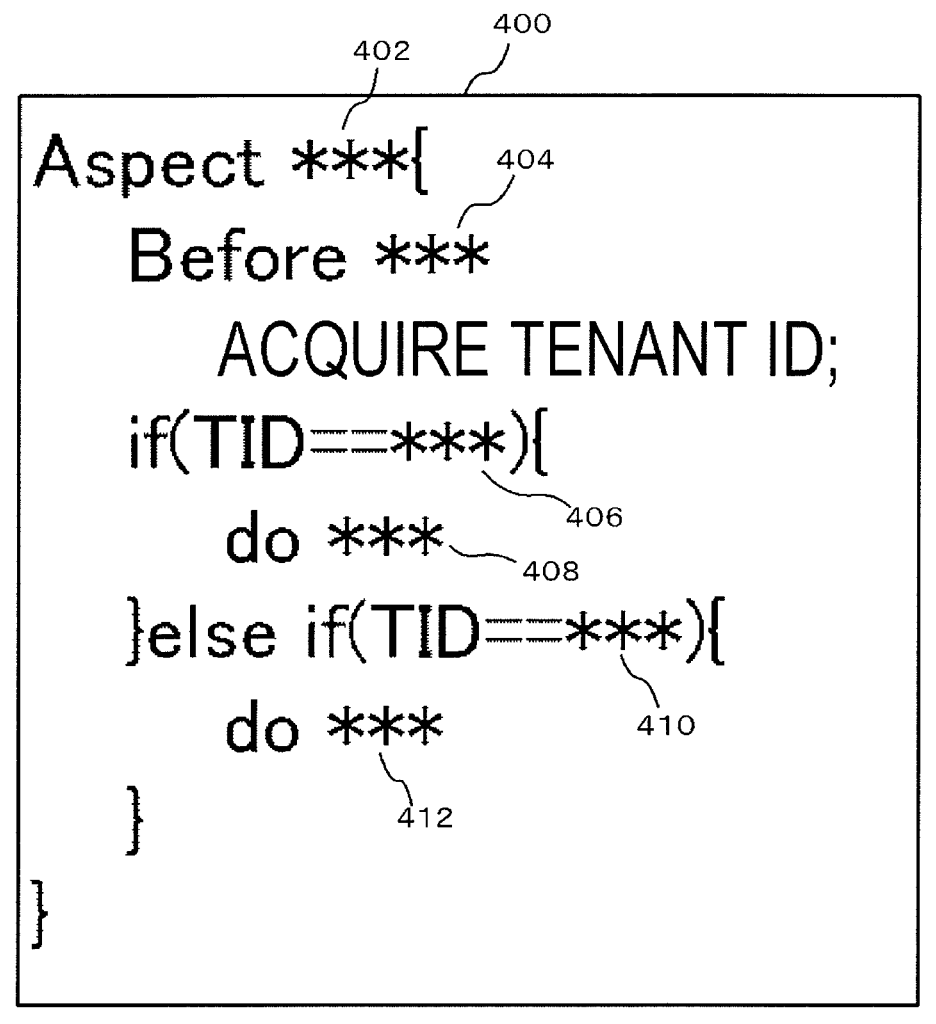
Figure 15:
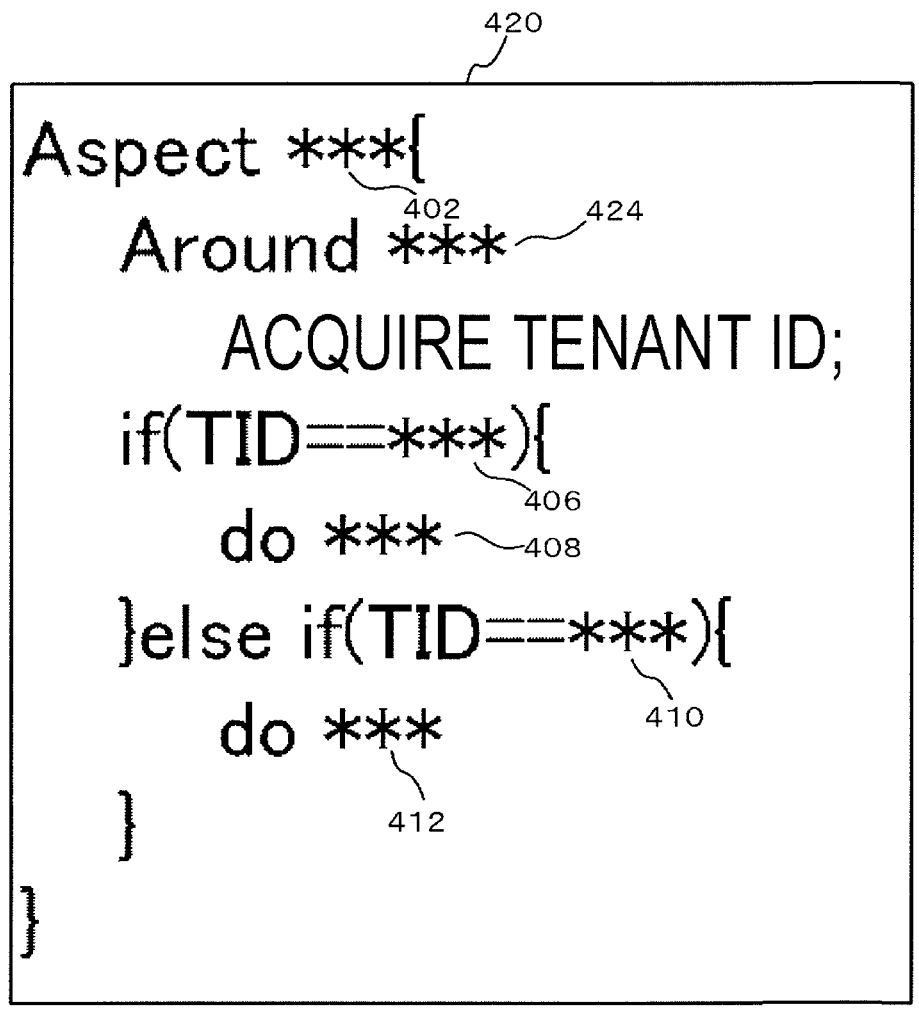
FIG. 15 is a diagram illustrating another example of the template of the program creation support apparatus according to the exemplary embodiment of the present invention.

The template storage unit 122 stores at least one model form used when the aspect synthesizing unit 140 described later synthesizes the aspect. As illustrated in FIGS. 14 and 15, the template storage unit 122 of the program creation support apparatus 100 of the present exemplary embodiment stores a first aspect template 400 and a second aspect template 420 as model forms. Although these templates are basically prepared in advance and used, the program editing unit 130 described later may create or register a new template, and delete and update an existing template as necessary.

In FIG. 14, the first aspect template 400 is used when an individual requirement is inserted at a position of a line number corresponding to an empty line of the basic program managed by the basic program management table 112. A model form is a type of template and enables a program code of a specific value or character strings to be inserted in an inserting portion which is represented as "***" in drawings, whereby the aspect can be synthesized by the aspect synthesizing unit 140 described later.

An inserting portion 402 of "Aspect *" represents an aspect name (aspect ID) which is an identifier unique to the aspect. The inserting portion 402 may be optional character strings unless it does not overlap the other aspect names, and may be a serial number, for example. In an inserting portion 404 of "Before *," a set of program strings corresponding to a line number subsequent to the line number corresponding to an empty line within the basic program at which insertion of individual requirement is designated is described. In this example, for example, when an individual requirement is inserted at the empty line of #6, "program string D" corresponding to a line number of #7 of a line subsequent to the empty line is described in the inserting portion 404.

In a subsequent advice, a set of program strings representing acquisition of user IDs (identifiers unique to users) and a set of program strings representing different individual requirements to be executed for each of the acquired user IDs are described.

That is, in order to execute different individual requirements for each user ID, an inserting portion 406 of "if (TID==*)" of a conditional branch represents a user ID (TID), and a user ID among the user IDs described in the user management table 116, which is stored in association with the same line number as the line number corresponding to the empty line described in conjunction with the inserting portion 404 of "Before *" is described.

Moreover, in an inserting portion 408 of "do *" which is a set of program strings representing different individual requirements to be executed for respective user IDs (identifiers unique to users), a set of program strings representing the individual requirement corresponding to the line number described in conjunction with the inserting portion 406 of "if(TID==*)" is described.

The set of program strings described within the template include a set of program strings for acquiring a user ID and a set of branching program strings for sorting individual requirements so as to be executed for each user ID.

For example, in the user management table 116 of FIG. 5, there are two tenants including the line number of #6 in which individual requirement is inserted, and the user IDs thereof are "TID0001" and "TID0002." The user ID of TID0001 is described in the inserting portion 406, and the corresponding individual requirement name (in this example, "individual requirement 10") is described in the corresponding inserting portion 408 of "do *." Further, the user ID of TID0002 is described in an inserting portion 410 of "else if (TID==*)," and the corresponding individual requirement name (in this example, "individual requirement 20") is described in the corresponding inserting portion 412 of "do ***."

In FIG. 15, the second aspect template 420 is used when an individual requirement is inserted at the position of the line number corresponding to a set of program strings, which is not an empty line of the basic program managed in the basic program management table 112. A set of program strings which is not an empty line is designated in an inserting portion 424 of "Around ***." The other inserting portions are treated in the same manner as the template of FIG. 14. For example, when individual requirement is inserted in a set F of program strings which is not the empty line, "program string F" corresponding to that line is described in the inserting portion 424.

Returning to FIG. 1, the individual requirement management unit 128 manages the sets of program strings that respectively implement the individual requirements unique to the users, which can be defined for each user. The sets of program strings themselves may be edited by the program editing unit 130 described later. The sets of program strings may be edited with respect to a single individual requirement, or the set of program strings may be edited at the same time when users create application programs. The individual requirements may be stored in the development program storage unit 120 by assigning the identification information of each of the individual requirements (individual requirement name or the like). A new individual requirement may be registered by the individual requirement management unit 128. When the new individual requirement is registered, the individual requirement management unit 128 sends a notification to the table management unit 118 so as to update the basic program management table 112, the individual requirement management table 114, and the user management table 116.

The program editing unit 130 provides the function of an editor which allows developers to edit programs based on the basic program. The editor function is an ordinary one. The program editing unit 130 displays a program editor screen illustrated in FIGS. 10 to 13, described later on the display unit 134 such as a display of the computer that implements the program creation support apparatus 100 and presents an editing target program to a program developer. Then, the operating unit 132 receives operations of the program developer through an input device such as a keyboard and a mouse, and the program developer can create, amend, or delete program strings.

In parallel with the editing operation, the program editing unit 130 sends a notification to the table management unit 118 or the individual requirement management unit 128 so as to create and update the basic program management table 112, the individual requirement management table 114, and the user management table 116. In the present exemplary embodiment, the program editing unit 130 may designate a development target user (tenant), for example, and display an editing screen as a user screen dedicated for the target user. Alternatively, instead of designating a user, users may log onto a system using user information (for example, a user ID and a password) set to each user in order to use the program creation support apparatus 100 so that the user can use a user screen dedicated for the authenticated user.

The aspect synthesizing unit 140 synthesizes the aspect, in which individual requirements of each user are implemented, in accordance with the model form stored in the template storage unit 122 based on the basic program management table 112, the individual requirement management table 114, and the user management table 116 managed by the table management unit 118. In the present exemplary embodiment, the aspect synthesized by the aspect synthesizing unit 140 is executed by being incorporated in the basic program by the program providing server 12 of FIG. 2, and a service is provided to the user terminal 20 of each user through the network 3. Alternatively, the aspect synthesized by the program creation support apparatus 100 and the basic program may be stored in the distribution program storage device 10 of FIG. 2 as a custom program for each user, and the program providing server 12 may execute the custom program for each user in accordance with the user's needs and provide a service to each user terminal 20.

The aspect synthesized by the aspect synthesizing unit 140 may be stored in the aspect storage unit 142. Alternatively, the aspect may be stored in the development program storage unit 120.

A program of the present exemplary embodiment is a program for causing a computer to implement a program creation support apparatus that creates a development target application program, the program being described such that the computer for implementing the program creation support apparatus 100 is caused to execute: a procedure for displaying and presenting an editing screen (the program editor screen 210 of FIG. 10) for allowing a program developer to edit an editing target program on the display unit 134 (see FIG. 1) by referring to the table storage unit 110; a procedure for receiving editing operations of inserting individual requirements, which can be defined for each user, in the basic program from the program developer through the operating unit 132 (see FIG. 1); a procedure for editing the program in accordance with the received editing operations; a procedure for managing the received individual requirements by registering the individual requirements in the user management table 116, the basic program management table 112, and the individual requirement management table 114 in association with corresponding sets of program strings of the basic program with respect to each target user; a procedure for synthesizing the aspect using the model form in accordance with the definitions registered in the user management table 116, the basic program management table 112, and the individual requirement management table 114 by referring to the table storage unit 110 and the template storage unit 122; and a procedure for executing an application program that implements individual requirements of each user together with the basic program.

The computer program of the present exemplary embodiment may be recorded on a computer-readable recording medium. The recording medium is not particularly limited, and various types of recording medium may be employed. Moreover, the program may be loaded onto a memory of a computer from the recording medium and may be downloaded to a computer through a network and loaded onto a memory.

Figure 6:
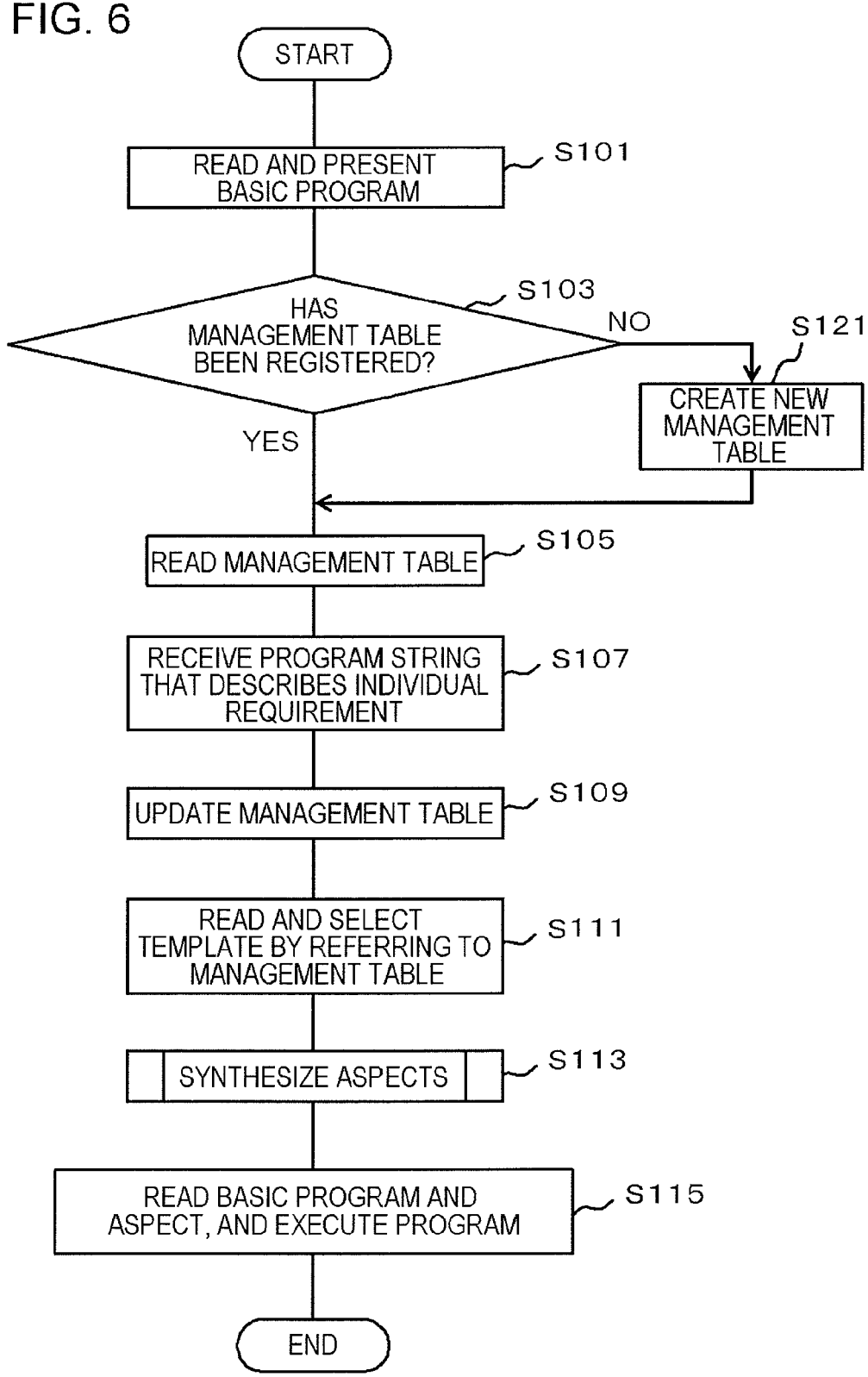
FIG. 6 is a flowchart illustrating an example of the operation of the program creation support apparatus of the information system, according to the exemplary embodiment of the present invention.

A data processing method according to the present exemplary embodiment by the thus constructed program creation support apparatus 100 as described above will be described herein later. FIG. 6 is a flowchart illustrating an example of the operation of the program creation support apparatus 100 according to the present exemplary embodiment.

A data processing method of the present exemplary embodiment causes the program creation support apparatus 100 (see FIG. 1) to: display and present an editing screen (the program editor screen 210 of FIG. 10) for allowing a program developer to edit an editing target program on the display unit 134 (see FIG. 1) by referring to the table storage unit 110; receive editing operations of inserting individual requirements, which can be defined for each user, in the basic program from the program developer using the operating unit 132 (see FIG. 1); edit the program in accordance with the received editing operations; register the received individual requirements in the user management table 116 (see FIG. 1), the basic program management table 112 (see FIG. 1), and the individual requirement management table 114 (see FIG. 1) in association with corresponding sets of program strings of the basic program with respect to each target user; synthesize the aspect using a model form in accordance with the definitions registered in the user management table 116, the basic program management table 112, and the individual requirement management table 114 by referring to the table storage unit 110 (see FIG. 1) and the template storage unit 122 (see FIG. 1); and execute the application program that implements individual requirements of each user together with the basic program.

Hereinafter, the operation of the program creation support apparatus 100 according to the present exemplary embodiment will be described with reference to FIGS. 1 to 6.

Specifically, as illustrated in FIG. 6, in the program creation support apparatus 100 (see FIG. 1), first, the program editing unit 130 (see FIG. 1) reads the basic program from the development program storage unit 120 (see FIG. 1) (step S101). The program editing unit 130 asks the table management unit 118 (see FIG. 1) about whether the basic program management table 112 (see FIG. 1), the individual requirement management table 114 (see FIG. 1), and the user management table 116 (see FIG. 1) corresponding to the read basic program are registered in the table storage unit 110 (see FIG. 1). The table management unit 118 determines whether each table is present by referring to the table storage unit 110.

When the table is not registered (No in step S103), the table management unit 118 creates a new basic program management table 112, a new individual requirement management table 114, and a new user management table 116 for the read basic program and stores the created tables in the table storage unit 110 (step S121). Then, the flow proceeds to step S105. On the other hand, when the table is registered (Yes in step S103), the program editing unit 130 reads the basic program management table 112, the individual requirement management table 114, and the user management table 116 from the table storage unit 110 by referring to the table storage unit 110 (step S105).

Figure 8:
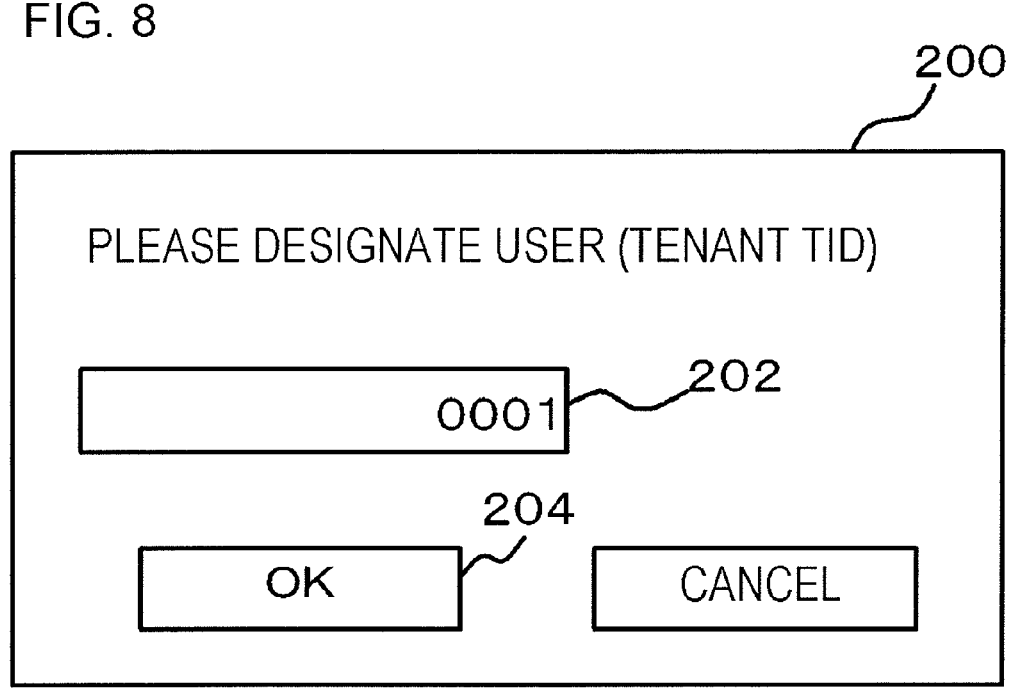
FIG. 8 is a diagram illustrating an example of a user designation screen of the program creation support apparatus according to the exemplary embodiment of the present invention.

Subsequently, the program editing unit 130 displays the program editor screen 210 of FIG. 10 on the display unit 134 (see FIG. 1) of the program creation support apparatus 100. In the present exemplary embodiment, before step S101 or step S107, a user designation screen 200 of FIG. 8 may be displayed on the display unit 134 of the program creation support apparatus 100. As illustrated in FIG. 8, the user designation screen 200 includes a user ID designating field 202 and an OK button 204. The program developer inputs the user ID of an editing target program, namely the tenant ID, in the user ID designating field 202 using the operating unit 132 or selects the same on a pull-down menu or the like. When the OK button 204 is pressed, the user ID designated in the user ID designating field 202 is received.

A program editor screen 210 of FIG. 10 is an example of the screen for editing a custom program of the user designated on the user designation screen 200 of FIG. 8. The program editor screen 210 displays a basic program list 300 of FIG. 9 as an editing target. Line numbers 212 are assigned to respective sets of program strings of the basic program. As illustrated in FIG. 10, assuming that a blank line is present between successive sets of program strings, the line numbers 212 are also assigned to the blank lines.

The identification information of the editing target user (tenant) (that is "TID0001" in FIG. 10) designated on the user designation screen 200 of FIG. 8 described above is displayed in a user ID display field 214 of the program editor screen 210. The position of a cursor 216 is highlighted in the program editor screen 210. Moreover, the program developer may designate an editing position by moving a pointer 218 using the operating unit 132. In this way, the program developer may edit the character indicated by the cursor 216 using a keyboard or the like and the position indicated by the mouse pointer 218. As above, the program developer can edit and manage the individual requirements of each user.

Returning to FIG. 6, the program editing unit 130 receives sets of program strings that describe the individual requirements of each user, created by the program developer on the program editor screen 210 using the operating unit 132 (step S107). The sets of program strings received by the program editing unit 130 are registered in the development program storage unit 120 by the individual requirement management unit 128, and then the individual requirement management unit 128 sends to the notification to the table management unit 118 so as to update the individual requirement management table 114 and the user management table 116.

That is, the program editing unit 130 includes a presenting unit (the program editor screen 210 of FIG. 10) that presents a plurality of sets of program strings of the basic program to the program developer and receives the positions of the plurality of sets of program strings of the basic program presented on the presenting unit, as designated by the program developer, as the inserting positions at which the individual requirements of the target user are inserted. The individual requirement management unit 128 sends a notification to the table management unit 118 so as to register the inserting positions and the individual requirements received by the program editing unit 130 in the user management table 116 and the individual requirement management table 114 in association with respect to each user and to manage the same.

According to this configuration, the program developer can edit programs by inserting the individual requirements of each user by referring to the presented a plurality of sets of program strings of the basic program.

Upon receiving the notification from the individual requirement management unit 128, the table management unit 118 updates the individual requirement management table 114 and the user management table 116 of the table storage unit 110 (step S109).

Moreover, the aspect synthesizing unit 140 reads templates and the basic program management table 112, the individual requirement management table 114, and the user management table 116 by referring to the template storage unit 122 and the table storage unit 110 (step S111). The aspect synthesizing unit 140 synthesizes the descriptions of the corresponding aspects at each pointcut based on these items of information (step S113). The synthesized aspects are stored in the development program storage unit 120. Details of this aspect synthesizing process will be described later.

The program providing server 12 (see FIG. 2) which is a program executing unit reads the basic program and the synthesized aspects and executes the program by incorporating the aspects in the basic program in accordance with an aspect-oriented programming method (step S115). In this way, a service using application programs that satisfy different individual requirements of each user can be provided to the user terminals 20 of respective users.

Hereinafter, a specific example of a process of editing individual requirements of each user in the program creation support apparatus 100 will be described in accordance with the editing operations of the program developer. This will be described with reference to FIGS. 1, 5, 10 to 13.

For example, as illustrated in FIG. 10, on the program editor screen 210, the program developer moves the pointer 218, using the operating unit 132 (see FIG. 1), to the position of the blank line on the sixth line between a set C of program strings and a set D of program strings in the basic program and selects the position. Then, as illustrated in FIG. 11, an individual requirement editing field 220 is unfolded so that a set of program strings that describes the individual requirement of the user of TID0001 may be edited. In the example of FIG. 11, although the individual requirement editing field 220 is unfolded on the program editor screen 210, the present invention is not limited to this, and another window may be opened so that editing may be made in the window.

The program developer describes the set of program string corresponding to the individual requirement 10 of the user of TID0001 in the individual requirement editing field 220 using the operating unit 132. In FIG. 11, although "individual requirement 10" is described, the individual requirement 10 may be a plurality of sets of program strings, for example, A10, B10, . . . , as illustrated in the individual requirement management table 114 of FIG. 4.

Returning to FIG. 11, after finishing the editing of the individual requirement 10 of the sixth line, the program developer further moves the pointer 218, using the operating unit 132, to the position of a set F of program strings corresponding to the eleventh line and selects the position. Then, as illustrated in FIG. 12, the individual requirement editing field 220 is unfolded at the position of the eleventh line, and the program developer may further describe the set of program strings corresponding to individual requirement 11 of the user of TID0001 in the individual requirement editing field 220. The individual requirement 11 may be a plurality of sets of program strings, for example, A11, B11, . . . , as illustrated in the individual requirement management table 114 of FIG. 4. In FIG. 12, the individual requirement 10 edited previously is inserted at the line number #6 and is presented on the program editor screen 210 as an edited individual requirement field 222.

Subsequently, the program developer finishes the editing of the program of the user of TID0001 and edits the program of the user of TID0002. The program editing unit 130 reads the basic program from the development program storage unit 120, and the program editor screen 210 for the user of TID0002 is displayed on the display unit 134 as illustrated in FIG. 13. The program may be edited in a manner similarly to the case of the user of TID0001.

In this example, for example, on the program editor screen 210, the program developer moves the pointer 218, using the operating unit 132, to the position of the blank line on sixth line between a set C of program strings and a set D of program strings of the basic program and selects the position. Then, the individual requirement editing field 220 is unfolded so that a set of program strings that describes the individual requirement of the user of TID0002 may be edited. The program developer describes the set of program strings corresponding to the individual requirement 20 of the user of TID0002 in the individual requirement editing field 220 using the operating unit 132. The individual requirement 20 may be a plurality of sets of program strings, for example, A20, B20, . . . , as illustrated in the individual requirement management table 114 of FIG. 4.

When the program developer finishes also the editing of the program of the user of TID0002, the program editing unit 130 receives the edited contents of these programs. The individual requirement management unit 128 stores the sets of program strings that describe the received respective individual requirements in the development program storage unit 120, and sends a notification to the table management unit 118 and the individual requirement management unit 128 so as to update the individual requirement management table 114 and the user management table 116 of the table storage unit 110. The time when the program editing unit 130 instructs the table management unit 118 and the individual requirement management unit 128 to update the respective tables is not limited thereto. For example, the tables may be updated upon receiving an instruction from the program developer as necessary, and may be updated periodically or upon completing the definition for each user.

The individual requirement management table 114 of the table storage unit 110 is updated as illustrated in FIG. 4, and the user management table 116 of the table storage unit 110 is updated as illustrated in FIG. 5.

In the present exemplary embodiment, although an example in which new individual requirement is input on the program editor screen 210 has been described, the present invention is not limited thereto. For example, the individual requirement registered in advance in the individual requirement management table 114 of the table storage unit 110 may be read and presented to the program developer so that a selected individual requirement may be inserted to the position of a designated line of the basic program on the program editor screen 210. Moreover, a set of program strings that describes the individual requirement registered in advance may be changed on the individual requirement editing field 220 of the program editor screen 210.

After the editing of programs is finished, the aspect synthesizing unit 140 reads the basic program management table 112, the individual requirement management table 114, and the user management table 116 from the table storage unit 110, and reads templates from the template storage unit 122. In the present exemplary embodiment, the above-described two templates illustrated in FIGS. 14 and 15 are prepared in advance, and the templates are read.

Figure 7:
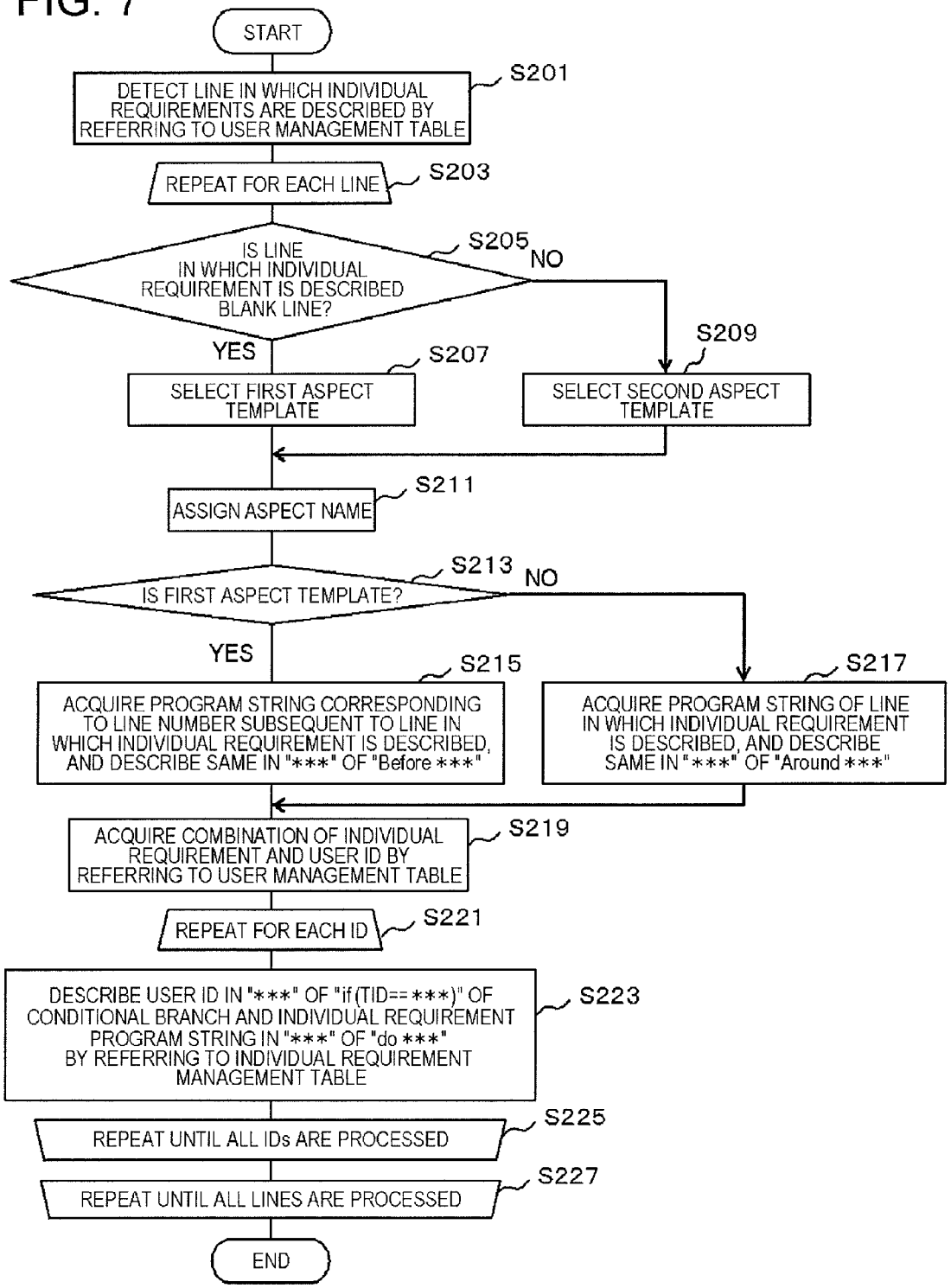
FIG. 7 is a flowchart illustrating an example of the procedures of an aspect synthesizing process in the program creation support apparatus according to the exemplary embodiment of the present invention.

Hereinafter, the details of the aspect synthesizing process will be described by way of a specific example with reference to FIG. 7. This will be described with reference to FIGS. 1, 3 to 5, 7, and 14 to 17. The process illustrated in this flowchart is the detailed process of step S113 of FIG. 6.

The aspect synthesizing unit 140 (see FIG. 1) performs the following processes. The aspect synthesizing unit 140 refers to the user management table 116 of FIG. 5 to detect that there are individual requirements to be inserted to the sixth and eleventh lines from the user management table 116 (step S201). Thus, first, the aspect to be incorporated in the sixth line is synthesized. The processes of steps S205 to S225 are repeatedly performed for each of the lines detected in step S210 (step S203). When all of the lines have been processed (step S227), this process ends.

Subsequently, it is determined whether the line in which the individual requirement is inserted is a blank line by referring to the basic program management table 112 of FIG. 3 (step S205). Here, since the sixth line is a blank line (step S205: YES), the first aspect template 400 of FIG. 14 corresponding to the empty line is selected and used (step S207).

In the first aspect template 400, an aspect name (aspect ID), for example, "XXX" is described in the inserting portion 402 of "Aspect *" (step S211). Here, since the first aspect template 400 is used (step S213: YES), a set of program strings (in this example, "program string D" corresponding to the line number #7 of a line subsequent to the empty line #6) corresponding to a line number subsequent to the line number corresponding to the empty line in the basic program, in which insertion of the individual requirement is designated, is acquired and described in the inserting portion 404 of "Before *" (step S215).

Moreover, a combination of individual requirement and the user ID (TID) in which the individual requirement is described in the corresponding line (in this example, the line number #6) is acquired by referring to the user management table 116 (step S219). In this example, two combinations of TID0001 and individual requirement 10 and TID0002 and individual requirement 20 are acquired.

The process of the subsequent step S223 is repeatedly performed for each user ID (step S221). The process is repeatedly performed until the process with respect to the entire user IDs acquired in step S219 have been processed (step S225). When the processes with respect to the entire user IDs have been finished, the flow proceeds to step S227. In step S223, "0001" of the TID which is the user ID acquired in step S219 is described in the inserting portion 406 of "if(TID==*)" of a conditional branch. Moreover, a set of program strings (contents such as A10, B10, representing the individual requirement 10 corresponding to the sixth line in which the user ID is the TID0001 is described in the inserting portion 408 of "do *."

Subsequently, the process of step S223 is repeatedly performed with respect to the subsequent user ID. That is, "0002" of the TID which is the user ID acquired in step S219 is described in the inserting portion 410 of "else if(TID=*)" of a conditional branch. Moreover, a set of program strings (contents such as A20, B20, representing the individual requirement 20 corresponding to the sixth line in which the user ID is the TID0002 is described in the inserting portion 412 of "do *." By this series of processing, an aspect synthesizing process using the first aspect template 400 ends. An aspect 440 obtained in this way is illustrated in FIG. 16.

Subsequently, processing is repeatedly performed with respect to the line number #11 which has not been processed among the lines detected in step S201. That is, returning to step S205, an aspect to be incorporated in the eleventh line of the user management table 116 is synthesized. It is determined whether the line in which the individual requirement is inserted is a blank line by referring to the basic program management table 112. Since the eleventh line is not a blank line (step S205: NO), the second aspect template 420 of FIG. 15 is selected and used (step S209).

In the second aspect template 420, an aspect name (aspect ID), for example, "YYY" is described in the inserting portion 402 of "Aspect *" (step S211). Here, since the second aspect template 420 is used (step S213: NO), a set of program strings (in this example, "program string F") in the basic program, in which insertion of the individual requirement is designated, is acquired and described in the inserting portion 424 of "Around *" (step S217).

Moreover, a combination of individual requirement and the user ID (TID) in which the individual requirement is described in the corresponding line, in this example, the line number #11, is acquired by referring to the user management table 116 (step S219). In this example, one combination of TID0001 and individual requirement 11 is acquired. Moreover, "0001" of the TID which is the user ID acquired in step S219 is described in the inserting portion 406 of "if (TID==*)" of a conditional branch. Moreover, a set of program strings (contents such as A11, B11, ...) representing the individual requirement 11 corresponding to the eleventh line in which the user ID is the TID0001 is described in the inserting portion 408 of "do *" (step S223).

Figure 17:
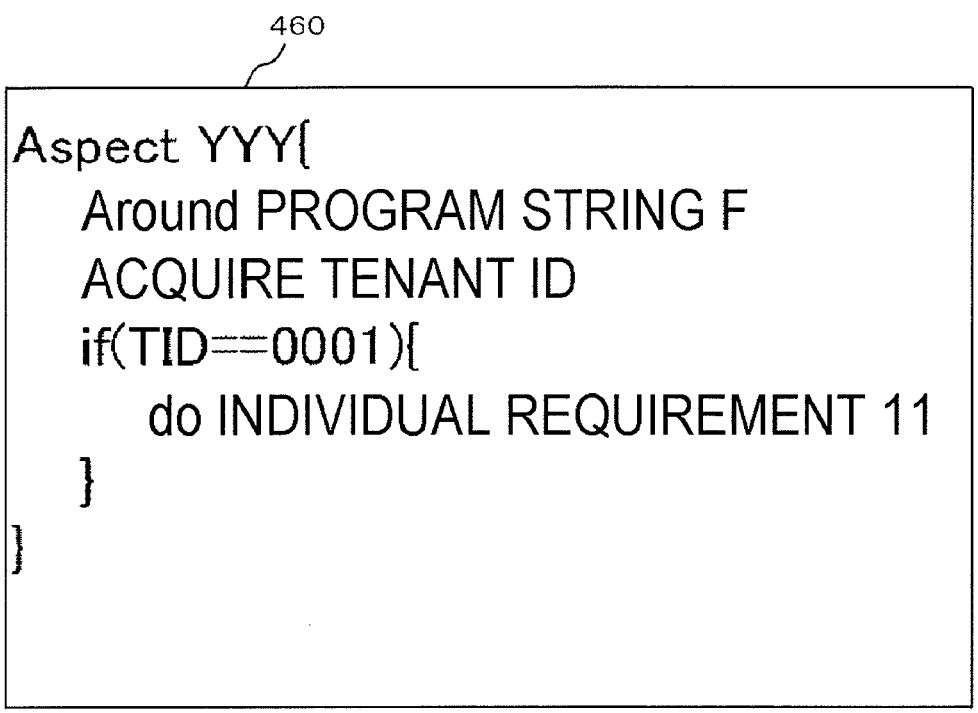
FIG. 17 is a diagram illustrating another example of the aspect created by the program creation support apparatus according to the exemplary embodiment of the present invention.

In this example, since only the user ID of TID0001 is present, the flow proceeds to step S227. By this series of processing, an aspect synthesizing process using the second aspect template 420 ends. An aspect 460 obtained in this way is illustrated in FIG. 17. Here, since all of the lines detected in step S201 have been processed, this processing ends.

In this way, respective aspects incorporated in the programs of the respective users are synthesized and stored in the aspect storage unit 142.

Subsequently, a case where services using these programs are provided to respective users will be described. As illustrated in FIGS. 1 and 2, the program developed by the program creation support apparatus 100 is stored in the distribution program storage device 10 by being copied from the development program storage unit 120 and the aspect storage unit 142. The program providing server 12 accesses the distribution program storage device 10, reads the basic program and the two aspects synthesized by the program creation support apparatus 100, and executes the program by incorporating the aspects in the basic program in accordance with an aspect-oriented programming method.

Figure 18:
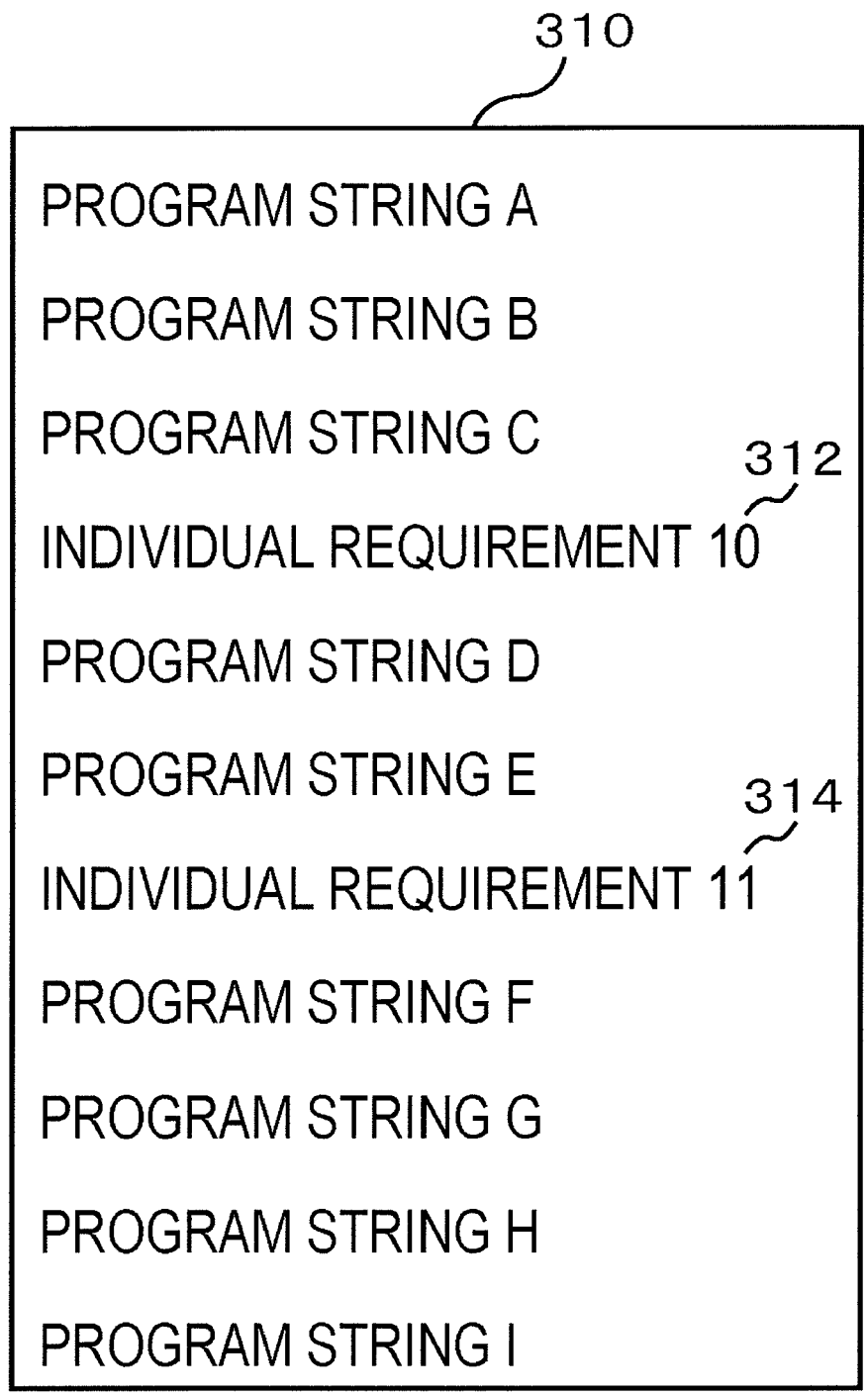
FIG. 18 is a diagram illustrating an example of a program list for an individual user, synthesized by the program creation support apparatus according to the exemplary embodiment of the present invention.
Figure 19:
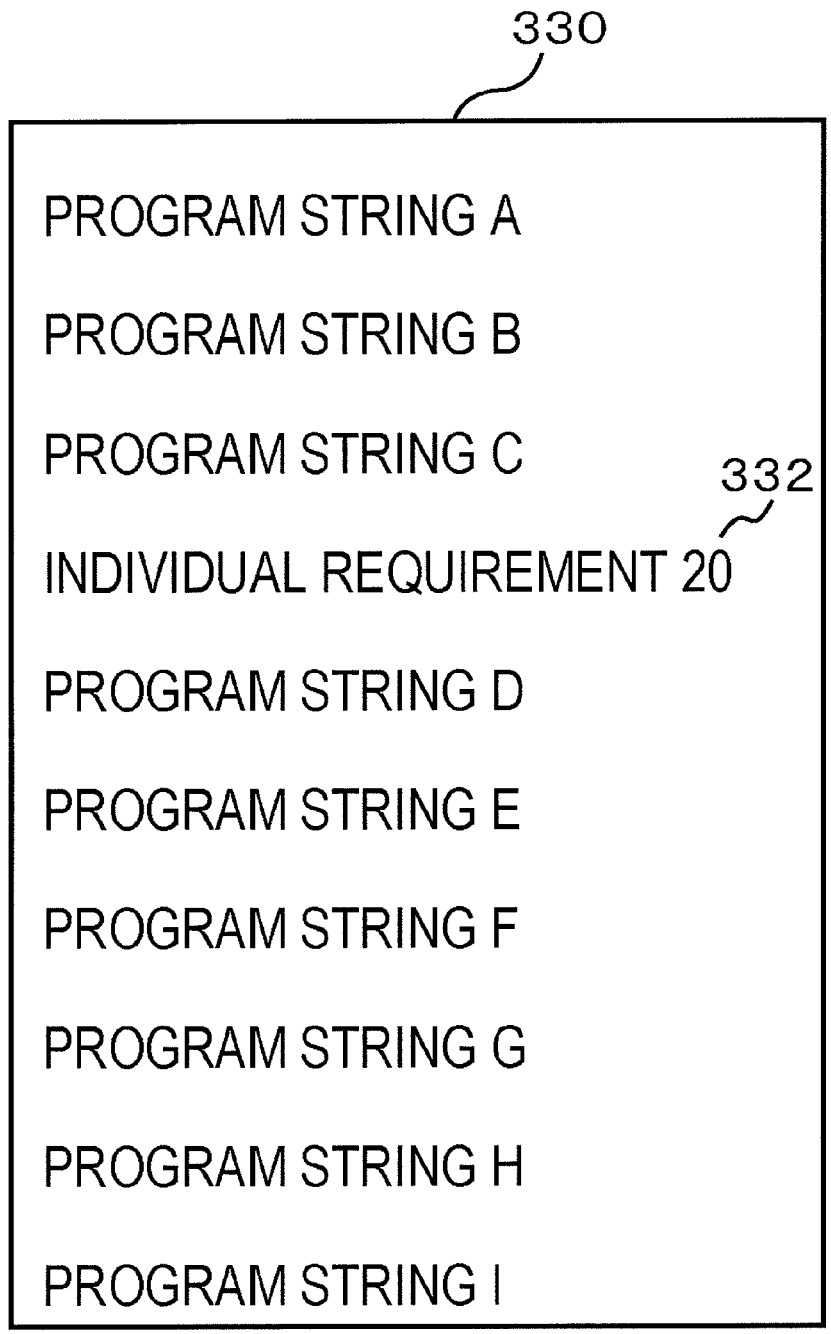
FIG. 19 is a diagram illustrating another example of the program list for an individual user, synthesized by the program creation support apparatus according to the exemplary embodiment of the present invention.

An example of an effective program 310 that is executed for the user of TID0001 by the program providing server 12 is illustrated in FIG. 18. As above, the program providing server 12 executes the individual requirement 10 (indicated by reference numeral 312) before the set D of program strings and executes the individual requirement 11 (indicated by reference numeral 314) instead of the set F of program strings. Moreover, an example of an effective program 330 that is executed for the user of TID0002 by the program providing server 12 is illustrated in FIG. 19. As above, the program providing server 12 executes the individual requirement 20 (indicated by reference numeral 332) before the set D of program strings.

As described above, according to the program creation support apparatus 100 of the present exemplary embodiment, since the corresponding aspects can be synthesized automatically just by inserting individual requirements to the basic program on an editing screen provided for each user, the program developer can perform the user (tenant)-based editing operation without paying attention to aspects. Thus, the program developer can easily develop and maintain a custom program for each user (tenant) corresponding to the user individual requirements. Therefore, it is possible to improve the efficiency of an operation of coping with the user individual requirements and mitigate the load on the program developer.

In this way, in aspect-based program management when implementing and executing programs, the program developer can perform a user (tenant)-based editing operation when developing programs or analyzing bugs. Thus, it is possible to support the creation of programs so as to be ideal for editing and analysis from the viewpoint of developers.

That is, it is possible to solve the problem that if a large number of tenant individual requirements are implemented in one aspect, or the individual requirement of one tenant is implemented by being distributed to a plurality of aspects, the program developer has to take the two perspectives of aspect and user (tenant) into consideration, which makes it difficult for the program developer to identify the effective program executed for each user (tenant).

While exemplary embodiments of the present invention have been described with reference to the drawings, these exemplary embodiments are examples of the present invention, and various other forms different from the above may be employed.

While the present invention has been described with reference to exemplary embodiments and examples thereof, the present invention is not limited to these exemplary embodiments and examples. Various changes conceivable to those skilled in the art can be made in form and details of the present invention within the scope of the present invention.

While the configuration of the present invention has been described, the present invention is not limited to this, but includes various exemplary embodiments. The following is the example thereof.

(i) A program creation support apparatus comprising:

a table storage device which stores a basic program management table which manages a plurality of sets of program strings which configures a basic program common to users of a development target application program, an individual requirement management table which manages sets of program strings which respectively implement individual requirements which can be defined for each user separately from the basic program, and a user management table which manages the individual requirements in association with each of the users;

a template storage device which stores model forms for generating aspects which implement the individual requirements;

a program editing unit which presents an editing target program to a program developer by referring to the table storage device, receives editing operations of inserting the individual requirements which can be defined for each user in the basic program, and edits the program in accordance with the received editing operations;

an individual requirement management unit which manages the individual requirements received by the program editing unit by registering the individual requirements in the user management table, the basic program management table, and the individual requirement management table in association with corresponding sets of program strings of the basic program with respect to each target user; and a synthesizing unit which synthesizes the aspect using the model form in accordance with the user management table, the basic program management table, and the individual requirement management table by referring to the table storage device and the template storage device, wherein the program creation support apparatus creates the application program which implements the individual requirements of each user together with the basic program, the basic program management table stores position identifiers of the positions of the plurality of sets of program strings included in the basic program and respective corresponding the sets of program strings in association, and the position identifier is a line number which is assigned to each of the sets of program strings of the basic program.

(ii) The program creation support apparatus according to (i), wherein the position identifier is the number of a block which represents a plurality of sets of program strings of the basic program.

(iii) The program creation support apparatus according to (ii), wherein the sets of program strings includes a blank block line defined between two successive sets of program strings, and the number of blocks are numbers which include those of corresponding blank block lines.

(iv) A data processing method of a program creation support apparatus which creates a development target application program, the program creation support apparatus comprising:

a table storage device which stores a basic program management table which manages a plurality of sets of program strings which configures a basic program common to users of the application program, an individual requirement management table which manages a set of program strings which respectively implement individual requirements which can be defined for each user separately from the basic program, and a user management table which manages the individual requirements in association with each of the users;

a template storage device which stores model forms for generating an aspect which implements the individual requirements;

a display unit which displays an operation screen and presents the operation screen to a program developer; and an operating unit which receives an operation of the program developer, the data processing method comprising:

displaying and presenting an editing screen for allowing the program developer to edit an editing target program by referring to the table storage device;

receiving editing operations of inserting the individual requirements, which can be defined for each user, in the basic program from the program developer through the operating unit;

editing the program in accordance with the received editing operations;

managing the received individual requirements by registering the individual requirements in the user management table, the basic program management table, and the individual requirement management table in association with corresponding sets of program strings of the basic program with respect to each target user;

synthesizing an aspect using the model form in accordance with the user management table, the basic program management table, and the individual requirement management table by referring to the table storage device and the template storage device; and executing the application program which implements the individual requirements of each user together with the basic program.

This application is based upon and claims the benefit of priority from Japanese Patent Application No. 2010-049333, filed on Mar. 5, 2010, the disclosure of which is incorporated herein in its entirety by reference.

The invention claimed is:

1. A program creation support apparatus comprising:
a table storage device which stores a basic program management table which manages a plurality of sets of program strings which configures a basic program common to users of a development target application program, an individual requirement management table which manages sets of program strings which respectively implement individual requirements which can he defined for each user separately from said basic program, and a user management table which manages said individual requirements in association with each of said users;
a template storage device which stores model forms for generating aspects which implement said individual requirements, said aspects corresponding to respective inserting positions at which respective individual requirements are inserted in a plurality of program strings of said basic program;
a program editing unit which presents an editing target program to a program developer by referring to said table storage device, receives editing operations of inserting said individual requirements which can be defined for each user in said basic program, and edits said program in accordance with the received editing operations;
an individual requirement management unit which manages said individual requirements received by said program editing unit by registering said individual requirements in said user management table, said basic program management table, and said individual requirement management table in association with corresponding sets of program strings of said basic program with respect to each target user; and
a synthesizing unit which synthesizes said aspect using said model form in accordance with said user management table, said basic program management table, and said individual requirement management table by referring to said table storage device and said template storage device;
wherein:
said program editing unit receives designations regarding inserting positions for each user at which respective individual requirements are inserted in a plurality of the program strings of said basic program;
said individual requirement management unit updates said user management table with respect to each user based on the received designations regarding the respective inserting positions;
said synthesizing unit refers to said user management table to detect the inserting positions at which said individual requirements are inserted in a plurality of said program strings of said basic program on the basis of the designations regarding the inserting positions, to synthesize aspects corresponding to respective detected inserting positions by using said model forms on the basis of the received designations regarding inserting positions of said individual requirements, said aspects being designed to respectively insert program strings of the respective individual requirements of at least one of the users in said program strings of said basic program;
said synthesizing unit creates said application program which implements said individual requirements of each user together with said basic program by incorporating the synthesized aspects;
said basic program management table has blank lines respectively inserted between successive two sets of program strings of said basic program and stores position identifiers assigned to positions of respective lines and respective corresponding sets of program strings in association, said lines including the inserted Hank lines and lines of said plurality of program strings of said basic program;
said template storage device stores a first template for synthesizing an aspect which is designed to insert said individual requirement before the set of program strings subsequent to the position of a blank indicated by said position identifier corresponding to an inserting position at which said individual requirement is inserted; and
said synthesizing unit determines whether said inserting position at which said individual requirement is inserted is the position of the blank within said. basic program by referring to said basic program management table, and when said inserting position is said position of the blank, synthesizes the aspect to be inserted before said set of program strings subsequent to said position of the blank indicated by said position identifier corresponding to said inserting position using said first template.

2. The program creation support apparatus according to claim 1, wherein said. program editing unit includes:
a presenting unit which presents said plurality of sets of program strings of said basic program to said program developer, and
said program editing unit makes said program developer designate said positions of said plurality of sets of program strings of said basic program. presented on said presenting unit, as inserting positions at which said individual requirements of said target user are inserted and receives the designated insetting positions,
said individual requirement management unit manages said inserting positions and said individual requirements received by said program editing unit by registering said inserting positions and said individual requirements in said user management table and said individual requirement management table in association.

3. The program creation support apparatus according to claim 1, wherein said individual requirement management table stores identification information of said individual requirement and at least one set of program strings which implements said individual requirement in association.

4. The program creation support apparatus according to claim 1, wherein said user management table stores a combination of identification information of said individual requirement and a position identifier within said basic program at which said individual requirement is inserted in association with respect to each user.

5. The program creation support apparatus according to claim 1, wherein said basic program management table stores position identifiers representing said positions of said plurality of sets of program strings included in said basic program and respective corresponding said sets of program strings in association.

6. The program creation support apparatus according to claim 1, wherein
  said template storage device stores a second template for synthesizing an aspect which is designed to insert, said individual requirement by overwriting the set of program strings at said position indicated by said position identifier corresponding to an inserting position at which said individual requirement is inserted, and
  said synthesizing unit determines whether said inserting position at which said individual requirement is inserted is the position of the blank within said basic program by referring to said basic program management table, and when said inserting position is not said position of the blank, synthesizes the aspect which is inserted by overwriting the set of program strings at said position indicated by said position identifier corresponding w said inserting position using said second template.

7. An information system, comprising:
  a table storage device which stores a basic program management table which manages a plurality of sets of program strings which configures a basic program common to users of a development target application program, an individual requirement management table which manages sets of program strings which respectively implement individual requirements which can be defined fbr each user separately from said basic program, and a user management table which manages said individual requirements in association with each of said users;
  a program storage device which stores a plurality of sets of said program strings of said basic program of an application program and the sets of program strings which respectively implement said individual requirements;
  a template storage device which stores model forms for generating an aspect which implements said individual requirements, said aspect corresponding to respective inserting positions at which respective individual requirements are inserted in a plurality of program. strings of said basic program;
  a program editing unit which presents an editing target program to a program developer by referring to said table storage device, receives editing operations of inserting said individual requirements which can be defined for each user in said basic program, and edits said program;
  an individual requirement management unit which manages said individual requirements received by said program editing unit by registering said individual requirements in said user management table, said basic program management table, and said individual requirement management table in association with corresponding sets of program strings of said basic program with respect to each target user;
  a synthesizing unit which synthesizes said aspect using said model form in accordance with said user management table, said basic program management table, and said individual requirement management table by referring to said table storage device and said template storage device; and
  a program executing unit which executes said application program which implements said individual requirements of each user together with said basic program by incorporating said aspect synthesized by said synthesizing unit;
  wherein:
  said program editing unit receives designations regarding inserting positions for each user at which respective individual requirements are inserted in a plurality of the program strings of said basic program;
  said individual requirement management unit updates said user management table with respect to each user based on the received designations regarding the respective inserting positions;
  said synthesizing unit refers to said user management table to detect the inserting positions at which said individual requirements are inserted in a plurality of said program strings of said basic program on the basis of the designations regarding the inserting positions, to synthesize aspects corresponding to respective detected inserting positions by using said model forms on the basis of the received designations regarding inserting positions of said individual requirements, said aspects being designed to respectively insert program strings of the respective individual requirements o˜f at least one of the users in said program strings of said basic program;
  said basic program management table has blank lines respectively inserted between successive two sets of program strings of said basic program and stores position identifiers assigned to positions of respective lines and respective corresponding sets of program strings in association, said lines including the inserted blank lines and lines of said plurality of program strings of said basic program;
  said template storage device stores a first template for synthesizing an aspect which is designed to insert said individual requirement before the set of program strings subsequent to the position of a blank indicated by said position identifier corresponding to an inserting position at which said individual requirement is inserted; and
  said synthesizing unit determines whether said inserting position at which said individual requirement is inserted is the position of the blank within said basic program by referring to said basic program management table. and when said inserting position is said position of the blank, synthesizes the aspect to be inserted before said set of program strings subsequent to said position of the blank indicated by said position identifier corresponding. to said inserting position using said first template.

8. A program, stored in a memory device, for causing a computer to implement a program creation support apparatus for creating a development target application program, said program creation support apparatus comprising:
  a table storage device which stores a basic program management table which manages a plurality of sets of program strings which configures a basic program common to users of said application program, an individual requirement management table which manages sets of program strings which respectively implement individual requirements which can be defined for each user separately from said basic program, and a user management table which manages said individual requirements in association with each of said users;
  a template storage device which stores model forms for generating an aspect which implements said individual requirements, said aspect corresponding to respective inserting positions at which respective individual requirements are inserted in a plurality of program strings of said basic program;
  a display unit which displays an operation screen to present said operation screen to a program developer; and
  an operating unit which receives operations of said program developer, said program causing the computer to execute:
a procedure for displaying and presenting an editing screen for allowing said program developer to edit an editing target program by referring to said table storage device;
a procedure for receiving editing operations of inserting said individual requirements, which can be defined for each user, in said basic program from said program developer through said operating unit;
a procedure for editing said program in accordance with the received editing operations;
a procedure for managing said received individual requirements by registering said individual requirements in said user management table, said basic program management table, and said individual requirement management table in association with corresponding sets of program strings of said basic program with respect to each target user;
a procedure for synthesizing said aspect using said model form in accordance with said user management table, said basic program management table, and said individual requirement management table by referring to said table storage device and said template storage device; and
a procedure for executing said application program which implements said individual requirements of each user together with said basic program by, incorporating the synthesized aspect;
wherein:
said procedure for editing includes receiving designations regarding inserting positions for each user at which respective individual requirements are inserted in a plurality of the program strings of said basic program;
said procedure for managing said received individual requirements includes updating said user management table with respect to each user based on the received designations regarding the respective inserting positions; and
said procedure for synthesizing includes referring to said user management table to detect the inserting positions at which said individual requirements are inserted in a plurality of said program strings of said basic program on the basis of the designations regarding the inserting positions, to synthesize aspects corresponding to respective detected inserting positions by using said model forms on the basis of the received designations regarding inserting positions of said individual requirements, said aspects being designed to respectively insert program strings of the respective individual requirements of at least one of the users in said program strings of said basic program;
said basic program management table has Hank lines respectively inserted between successive two sets of program strings of said basic program and stores position identifiers assigned to positions of respective lines and respective corresponding sets of program strings in association. said lines including the inserted blank hoes and lines of said plurality of program strings of said basic program;
said template storage device stores a first template for synthesizing an aspect Which is designed to insert said individual requirement before the set of program strings subsequent to the position of a. blank indicated by said position identifier corresponding to an inserting position at which said individual requirement is inserted; and
said procedure for synthesizing determines whether said inserting position at which said individual requirement is inserted is the position of the blank within said basic program. by referring to said basic program management table, and when said inserting position is said position of the blank, synthesizes the aspect to be inserted before said set of program strings subsequent to said position of the blank indicated by said position identifier corresponding to said inserting position using said first template.

9. The program creation support apparatus according to claim 1, wherein said program editing unit allows said program developer to use either of two designating methods, so as to receive said designations regarding the respective inserting positions of individual requirements, said designation methods including a first designating method of designating a position between two successive sets of program strings of said basic program as the inserting positions at which said program string of said individual requirement is inserted between said two successive sets of program strings of said basic program, and a second designating method of designating a position at the program strings of said basic program as the inserting positions on which said program string of said individual requirement is overwritten;
wherein:
said individual requirement management unit registers said program strings of said individual requirements, and the designations regarding the respective inserting positions of said individual requirements including information on the designating methods in said user management table in association with respect to each target user;
said template storage device stores a first template for synthesizing an aspect designed to insert said string of the individual requirement between said two successive sets of program strings of said basic program when said the inserting position is designated by said first designating method, and a second template tbr synthesizing an aspect designed to overwrite the set of said program strings of the individual requirement on the program string of said basic program when the inserting position is designated by said second designation method, and
said synthesizing unit synthesizes aspects corresponding to respective detected inserting positions respectively by using one of said first model form and said second model form selected according to the designating method.

10. A program creation support apparatus comprising:
a table storage device which stores a basic program management table which manages a plurality of sets of program strings which configures a basic program common to users of a development target application program, an individual requirement management table which manages sets of program strings which respectively implement individual requirements which can be defined for each user separately from said basic program, and a user management table which manages said individual requirements in association with each of said users;
a template storage device which stores model forms for generating aspects which implement said individual requirements, said aspects corresponding to respective inserting positions at which respective individual requirements are inserted in a plurality of program strings of said basic program;
a program editing unit which presents an editing target program to a program developer by referring to said table storage device, receives editing operations of inserting said individual requirements which can be defined for each user in said basic program, and edits said program in accordance with the received editing operations;

an individual requirement management unit which manages said individual requirements received by said program editing unit by registering said individual requirements in said user management table, said basic program management table, and said individual requirement management table in association with corresponding sets of program strings of said basic program with respect to each target user; and a synthesizing unit which synthesizes said aspect using said model form in accordance with said user management table, said basic program management table, and said individual requirement management table by referring to said table storage device and said template storage device;

wherein:

said program editing unit receives designations regarding inserting positions for each user at which respective individual requirements are inserted in a plurality of the program strings of said basic program;

said individual requirement management unit updates said user management table with respect to each user based on the received designations regarding the respective inserting positions;

said synthesizing unit refers to said user management table to detect the inserting positions at which said individual requirements are inserted in a plurality of said program strings of said basic program on the basis of the designations regarding the inserting positions, to synthesize aspects corresponding to respective detected inserting positions by using said model forms on the basis of the received designations regarding inserting positions of said individual requirements, said aspects being designed to respectively insert program strings of the respective individual requirements of at least one of the users in said program strings of said basic program;

said synthesizing unit creates said application program which implements said individual requirements of each user together with said basic program by incorporating the synthesized aspects;

said basic program management table has blank lines respectively inserted between successive two sets of program strings of said basic program and stores position identifiers-assigned to positions of respective lines and respective corresponding sets of program strings in association, said lines including the inserted blank lines and lines of said plurality of program strings of said basic program;

said template storage device stores a second template for synthesizing an aspect which is designed to insert said individual requirement by overwriting the set of program strings at said position indicated by said position identifier corresponding to an inserting position at which said individual requirement is inserted, and said synthesizing unit determines whether said inserting position at which said individual requirement is inserted is the position of the blank within said basic program by referring to said basic program management table, and when said inserting position is not said position of the blank, synthesizes the aspect which is inserted by overwriting the set of program strings at said position indicated by said position identifier corresponding to said inserting position using said second template.

11. The program creation support apparatus according to claim 10, wherein said program editing unit includes:

a presenting unit which presents said plurality of sets of program strings of said basic program to said program developer, and said program editing unit makes said program developer designate said positions of said plurality of sets of program strings of said basic program presented on said presenting unit, as inserting positions at which said individual requirements of said target user are inserted and receives the designated inserting positions, said individual requirement management unit manages said inserting positions and said individual requirements received by said program editing unit by registering said inserting positions and said individual requirements in said user management table and said individual requirement management table in association.

12. The program creation support apparatus according to claim 10, wherein said individual requirement management table stores identification information of said individual requirement and at least one set of program strings which implements said individual requirement in association.

13. The program creation support apparatus according to claim 10, wherein said user management table stores a combination of identification information of said individual requirement and a position identifier within said basic program at which said individual requirement is inserted in association with respect to each user.

14. The program creation support apparatus according to claim 10, wherein said basic program management table stores position identifiers representing said positions of said plurality of sets of program strings included in said basic program and respective corresponding said sets of program strings in association.

15. The program creation support apparatus according to claim 10, wherein said template storage device stores a first template for synthesizing an aspect which is designed to insert said individual requirement before the set of program strings subsequent to the position of a blank indicated by said position identifier corresponding to an inserting position at which said individual requirement is inserted, and said synthesizing unit determines whether said inserting position at which said individual requirement is inserted is the position of the blank within said basic program by referring to said basic program management table, and when said inserting position is said position of the blank, synthesizes the aspect to be inserted before said set of program strings subsequent to said position of the blank indicated by said position identifier corresponding to said inserting position using said first template.

16. The program creation support apparatus according to claim 10, wherein said template storage device stores a first template for synthesizing an aspect which is designed to insert said individual requirement before the set of program strings subsequent to the position of a blank indicated by said position identifier corresponding to an inserting position at which said individual requirement is inserted, and a second template for synthesizing an aspect which is designed to insert said individual requirement by overwriting the set of program strings at said position indicated by said position identifier corresponding to an inserting position at which said individual requirement is inserted; and said synthesizing unit determines whether said inserting position at which said individual requirement is inserted is the position of the blank within said basic program by referring to said basic program management table, and either synthesizes the aspect to be inserted before said set of program strings subsequent to said position of the blank indicated by said position identifier corresponding to said inserting position using said first template when said inserting position is said position of the blank, or synthesizes the aspect which is inserted by overwriting the set of program strings at said position indicated by said position identifier corresponding to said inserting position using said second template when said inserting position is not said position of the blank.

17. The program creation support apparatus according to claim 1, wherein
said template storage device stores a first template for synthesizing an aspect which is designed to insert said individual requirement before the set of program. strings subsequent to the position of a blank indicated by said position identifier corresponding to an inserting position at which said individual requirement is inserted, and a second template for synthesizing an aspect which is designed to insert said individual requirement by overwriting the set of program strings at said position indicated by said position identifier corresponding to an inserting position at which said individual requirement is inserted; and
said synthesizing unit determines whether said inserting position at which said individual requirement is inserted is the position of the blank within said basic program by referring to said basic program management table, and either synthesizes the aspect to be inserted before said set of program strings subsequent to said position of the blank indicated by said position identifier corresponding to said inserting position using said first template when said inserting position is said position of the blank, or synthesizes the aspect which is inserted by overwriting the set of program strings at said position indicated by said position identifier corresponding to said inserting position using said second template when said inserting position is not said position of the blank.

18. An information system, comprising:
a table storage device which stores a basic program management table which manages a plurality of sets of program strings which configures a basic program common to users of a development target application program, an individual requirement management table which manages sets of program strings which respectively implement individual requirements which can be defined for each user separately from said basic program, and a user management table which manages said individual requirements in association with each of said users;
a program storage device which stores a plurality of sets of said program strings of said basic program of an application program and the sets of program strings which respectively implement said individual requirements;
a template storage device which stores model forms for generating an aspect which implements said individual requirements, said aspect corresponding to respective inserting positions at which respective individual requirements are inserted in a plurality of program strings of said basic program;
a program editing unit which presents an editing target program to a program developer by referring to said table storage device, receives editing operations of inserting said individual requirements which can be defined for each user in said basic program, and edits said program;
an individual requirement management unit which manages said individual requirements received by said program editing unit by registering said individual requirements in said user management table, said basic program management table, and said individual requirement management table in association with corresponding sets of program strings of said basic program with respect to each target user;
a synthesizing unit which synthesizes said aspect using said model form in accordance with said user management table, said basic program management table, and said individual requirement management table by referring to said table storage device and said template storage device; and
a program executing unit which executes said application program which implements said individual requirements of each user together with said basic program by incorporating said aspect synthesized by said synthesizing unit;
wherein:
said program editing unit receives designations regarding inserting positions for each user at which respective individual requirements are inserted in a plurality of the program strings of said basic program;
said individual requirement management unit updates said user management table with respect to each user based on the received designations regarding the respective inserting positions; and
said synthesizing unit refers to said user management table to detect the inserting positions at which said individual requirements are inserted in a plurality of said program strings of said basic program on the basis of the designations regarding the inserting positions, to synthesize aspects corresponding to respective detected inserting positions by using said model forms on the basis of the received designations regarding inserting positions of said individual requirements, said aspects being designed to respectively insert program strings of the respective individual requirements of at least one of the users in said program strings of said basic program;
said basic program management table has blank lines respectively inserted between successive two sets of program strings of said basic program and stores position identifiers assigned to positions of respective lines and respective corresponding sets of program strings in association, said lines including the inserted blank lines and lines of said plurality of program strings of said basic program;
said template storage device stores a second template for synthesizing an aspect which is designed to insert said individual requirement by overwriting the set of program strings at said position indicated by said position identifier corresponding to an inserting position at which said individual requirement is inserted, and
said synthesizing unit determines whether said inserting position at which said individual requirement is inserted is the position of the blank within said basic program by referring to said basic program management table, and when said inserting position is not said position of the blank, synthesizes the aspect which is inserted by overwriting the set of program strings at said position indicated by said position identifier corresponding to said inserting position using said second template.

19. A computer executing a program to implement a program creation support apparatus for creating a development target application program, said program creation support apparatus comprising:
a table storage device which stores a basic program management table which manages a plurality of sets of program strings which configures a basic program common to users of said application program, an individual requirement management table which manages sets of program strings which respectively implement individual requirements which can be defined for each user separately from said basic program, and a user management table which manages said individual requirements in association with each of said users;

a template storage device which stores model forms tor generating an aspect which implements said individual requirements, said aspect corresponding to respective inserting positions at which respective individual requirements are inserted in a plurality of program strings of said basic program;

a display unit which displays an operation screen to present said operation screen to a program developer; and an operating unit which receives operations of said program developer;

said program causing the computer to execute:

a procedure for displaying and presenting an editing screen for allowing said program developer to edit an editing target program by referring to said table storage device;

a procedure for receiving editing operations of inserting said individual requirements, which can be defined for each user, in said basic program from said program developer through said operating unit;

a procedure for editing said program in accordance with the received editing operations;

a procedure for managing said received individual requirements by registering said individual requirements in said user management table, said basic program management table, and said individual requirement management table in association with corresponding sets of program strings of said basic program. with respect to each target user;

a procedure for synthesizing said aspect using said model form in accordance with said user management table, said basic program management table, and said individual requirement management table by referring to said table storage device and said template storage device; and a procedure for executing said application program which implements said individual requirements of each user together with said basic program by incorporating the synthesized aspect;

wherein:

said procedure for editing includes receiving designations regarding inserting positions for each user at which respective individual requirements are inserted in a plurality of the program strings of said basic program;

said procedure for managing said received individual requirements includes updating said user management table with respect to each user based on the received designations regarding the respective inserting positions; and said procedure for synthesizing includes referring to said user management table to detect the inserting positions at which said individual requirements are inserted in a plurality of said program strings of said basic program on the basis of the designations regarding the inserting positions, to synthesize aspects corresponding to respective detected inserting positions by using said model forms on the basis of the received designations regarding inserting positions of said individual requirements, said aspects being designed to respectively insert program strings of the respective individual requirements of at least one of the users in said program strings of said basic program;

said basic program management table has blank lines respectively inserted between successive two sets of program strings of said basic program and stores position identifiers assigned to positions of respective lines and respective corresponding sets of program strings in association, said lines including the inserted blank lines and lines of said plurality of program strings of said basic program;

said template storage device stores a second template for synthesizing an aspect which is designed to insert said individual requirement by overwriting the set of program strings at said position indicated by said position identifier corresponding to an inserting position at which said individual requirement is inserted, and said synthesizing unit determines whether said inserting position at which said individual requirement is inserted is the position of the blank within said basic program by referring to said basic program management table, and when said inserting position is not said position of the blank, synthesizes the aspect which is inserted by overwriting the set of program strings at said position indicated by said position identifier corresponding to said inserting position using said second template.

\* \* \* \* \*